(12) United States Patent
Higgins-Luthman

(10) Patent No.: US 8,543,277 B2
(45) Date of Patent: *Sep. 24, 2013

(54) IMAGING SYSTEM FOR VEHICLE

(71) Applicant: Donnelly Corporation, Holland, MI (US)

(72) Inventor: Michael J. Higgins-Luthman, Livonia, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/776,100

(22) Filed: Feb. 25, 2013

(65) Prior Publication Data

US 2013/0162828 A1 Jun. 27, 2013

Related U.S. Application Data

(63) Continuation of application No. 13/566,266, filed on Aug. 3, 2012, now Pat. No. 8,386,114, which is a continuation of application No. 13/370,694, filed on Feb. 10, 2012, now Pat. No. 8,239,086, which is a continuation of application No. 13/190,931, filed on Jul. 26, 2011, now Pat. No. 8,116,929, which is a continuation of application No. 12/979,497, filed on Dec. 28, 2010, now Pat. No. 7,991,522, which is a continuation of application No. 12/764,355, filed on Apr. 21, 2010, now Pat. No. 7,877,175, which is a continuation of application No. 11/315,675, filed on Dec. 22, 2005, now Pat. No. 7,720,580.

(60) Provisional application No. 60/638,687, filed on Dec. 23, 2004.

(51) Int. Cl.
*G01C 22/00* (2006.01)
*G05D 1/00* (2006.01)

(52) U.S. Cl.
USPC ............ 701/28; 701/36; 250/208.1; 382/104; 382/199

(58) Field of Classification Search
USPC .......... 701/28, 36, 301; 250/208.1; 340/435, 340/436; 382/104, 199
See application file for complete search history.

(56) References Cited

U.S. PATENT DOCUMENTS 3,882,268 A 5/1975 Ogawa et al.
4,258,979 A 3/1981 Mahin
(Continued)

FOREIGN PATENT DOCUMENTS

DE 19962997 6/2001
DE 102006044615 3/2008
(Continued)

OTHER PUBLICATIONS

Van Leuven et al., "Real-Time Vehicle Tracking in Image Sequences", IEEE, US, vol. 3, May 21, 2001, pp. 2049-2054, XP010547308.

(Continued)

*Primary Examiner* — Khoi Tran
*Assistant Examiner* — Jaime Figueroa
(74) *Attorney, Agent, or Firm* — Gardner, Linn, Burkhart & Flory, LLP

(57) ABSTRACT

A vehicular imaging system includes an imaging device that captures image data and a control for processing captured image data. The control may utilize edge detection in processing captured image data. Responsive at least in part to processing of captured image data by the control, the control determines objects of interest present in the field of view of the imaging device. The objects of interest determined to be present in the field of view of the imaging device include at least one of (i) vehicles present exterior of the vehicle, (ii) headlights of vehicles present exterior of the vehicle, (iii) a bicycle that is present exterior of the vehicle and (iv) a bicycle rider that is present exterior of the vehicle. Responsive at least in part to processing of captured image data by the control, a driver of the vehicle is alerted to a hazardous condition.

47 Claims, 11 Drawing Sheets

(56) References Cited

U.S. PATENT DOCUMENTS

| | | | |
|---|---|---|---|
| 4,600,913 | A | 7/1986 | Caine |
| 4,847,772 | A | 7/1989 | Michalopoulos et al. |
| 4,907,870 | A | 3/1990 | Brucker |
| 4,931,937 | A | 6/1990 | Kakinami et al. |
| 4,942,533 | A | 7/1990 | Kakinami et al. |
| 4,970,653 | A | 11/1990 | Kenue |
| 4,971,430 | A | 11/1990 | Lynas |
| 5,070,454 | A | 12/1991 | Griffith |
| 5,097,362 | A | 3/1992 | Lynas |
| 5,128,874 | A | 7/1992 | Bhanu et al. |
| 5,177,685 | A | 1/1993 | Davis et al. |
| 5,189,561 | A | 2/1993 | Hong |
| 5,294,991 | A | 3/1994 | Oshima et al. |
| 5,304,980 | A | 4/1994 | Maekawa |
| 5,333,111 | A | 7/1994 | Chaiken et al. |
| 5,355,118 | A | 10/1994 | Fukuhara |
| 5,365,603 | A | 11/1994 | Karmann |
| 5,369,590 | A | 11/1994 | Karasudani |
| 5,424,952 | A | 6/1995 | Asayama |
| 5,426,294 | A | 6/1995 | Kobayashi et al. |
| 5,448,484 | A | 9/1995 | Bullock et al. |
| 5,487,116 | A | 1/1996 | Nakano et al. |
| 5,500,766 | A | 3/1996 | Stonecypher |
| 5,521,633 | A | 5/1996 | Nakajima et al. |
| 5,521,843 | A | 5/1996 | Hashima et al. |
| 5,523,811 | A | 6/1996 | Wada et al. |
| 5,530,771 | A | 6/1996 | Meakawa |
| 5,537,003 | A | 7/1996 | Bechtel et al. |
| 5,541,590 | A | 7/1996 | Nishio |
| 5,550,677 | A | 8/1996 | Schofield et al. |
| 5,555,555 | A | 9/1996 | Sato et al. |
| 5,568,190 | A | 10/1996 | Noguchi et al. |
| 5,581,464 | A | 12/1996 | Woll et al. |
| 5,596,365 | A | 1/1997 | Erickson et al. |
| 5,617,085 | A | 4/1997 | Tsutsumi et al. |
| 5,627,586 | A | 5/1997 | Yamasaki |
| 5,638,116 | A | 6/1997 | Shimoura et al. |
| 5,642,093 | A | 6/1997 | Kinoshita et al. |
| 5,642,299 | A | 6/1997 | Hardin et al. |
| 5,668,663 | A | 9/1997 | Varaprasad et al. |
| 5,670,935 | A | 9/1997 | Schofield et al. |
| 5,675,489 | A | 10/1997 | Pomerleau |
| 5,715,093 | A | 2/1998 | Schierbeek et al. |
| 5,724,187 | A | 3/1998 | Varaprasad et al. |
| 5,745,310 | A | 4/1998 | Mathieu |
| 5,760,962 | A | 6/1998 | Schofield et al. |
| 5,786,772 | A | 7/1998 | Schofield et al. |
| 5,790,403 | A | 8/1998 | Nakayama |
| 5,796,094 | A | 8/1998 | Schofield et al. |
| 5,798,575 | A | 8/1998 | O'Farrell et al. |
| 5,837,994 | A | 11/1998 | Stam et al. |
| 5,845,000 | A | 12/1998 | Breed et al. |
| 5,850,254 | A | 12/1998 | Takano et al. |
| 5,877,897 | A | 3/1999 | Schofield et al. |
| 5,884,212 | A | 3/1999 | Lion |
| 5,890,083 | A | 3/1999 | Franke et al. |
| 5,892,855 | A | 4/1999 | Kakinami et al. |
| 5,929,784 | A | 7/1999 | Kawaziri et al. |
| 5,929,786 | A | 7/1999 | Schofield et al. |
| 5,949,331 | A | 9/1999 | Schofield et al. |
| 6,005,492 | A | 12/1999 | Tamura et al. |
| 6,009,377 | A | 12/1999 | Hiwatashi |
| 6,044,321 | A | 3/2000 | Nakamura et al. |
| 6,049,619 | A | 4/2000 | Anandan et al. |
| 6,097,023 | A | 8/2000 | Schofield et al. |
| 6,104,552 | A | 8/2000 | Thau et al. |
| 6,163,083 | A | 12/2000 | Kramer et al. |
| 6,169,940 | B1 | 1/2001 | Jitsukata et al. |
| 6,173,222 | B1 | 1/2001 | Seo et al. |
| 6,201,236 | B1 | 3/2001 | Juds |
| 6,201,642 | B1 | 3/2001 | Bos |
| 6,218,960 | B1 | 4/2001 | Ishikawa et al. |
| 6,222,447 | B1 | 4/2001 | Schofield et al. |
| 6,226,389 | B1 | 5/2001 | Lemelson et al. |
| 6,226,592 | B1 | 5/2001 | Luckscheiter et al. |
| 6,243,003 | B1 | 6/2001 | DeLine et al. |
| 6,246,961 | B1 | 6/2001 | Sasaki et al. |
| 6,249,214 | B1 | 6/2001 | Kashiwazaki |
| 6,250,148 | B1 | 6/2001 | Lynam |
| 6,269,308 | B1 | 7/2001 | Kodaka et al. |
| 6,278,377 | B1 | 8/2001 | DeLine et al. |
| 6,282,483 | B1 | 8/2001 | Yano et al. |
| 6,285,393 | B1 | 9/2001 | Shimoura et al. |
| 6,292,111 | B1 | 9/2001 | Ishikawa et al. |
| 6,292,752 | B1 | 9/2001 | Franke et al. |
| 6,313,454 | B1 | 11/2001 | Bos et al. |
| 6,317,057 | B1 | 11/2001 | Lee |
| 6,320,176 | B1 | 11/2001 | Schofield et al. |
| 6,330,511 | B2 | 12/2001 | Ogura et al. |
| 6,341,523 | B2 | 1/2002 | Lynam |
| 6,353,392 | B1 | 3/2002 | Schofield et al. |
| 6,396,397 | B1 | 5/2002 | Bos et al. |
| 6,411,204 | B1 | 6/2002 | Bloomfield et al. |
| 6,420,975 | B1 | 7/2002 | DeLine et al. |
| 6,433,676 | B2 | 8/2002 | DeLine et al. |
| 6,485,155 | B1 | 11/2002 | Duroux et al. |
| 6,498,620 | B2 | 12/2002 | Schofield et al. |
| 6,580,996 | B1 | 6/2003 | Friedrich |
| 6,590,719 | B2 | 7/2003 | Bos |
| 6,594,583 | B2 | 7/2003 | Ogura et al. |
| 6,671,607 | B2 | 12/2003 | Ishizu et al. |
| 6,690,268 | B2 | 2/2004 | Schofield et al. |
| 6,691,008 | B2 | 2/2004 | Kondo et al. |
| 6,708,100 | B2 | 3/2004 | Russell et al. |
| 6,717,610 | B1 | 4/2004 | Bos et al. |
| 6,748,312 | B2 | 6/2004 | Russell et al. |
| 6,757,109 | B2 | 6/2004 | Bos |
| 6,760,471 | B1 | 7/2004 | Raymond |
| 6,823,241 | B2 | 11/2004 | Shirato et al. |
| 6,824,281 | B2 | 11/2004 | Schofield et al. |
| 6,882,287 | B2 | 4/2005 | Schofield |
| 6,928,180 | B2 | 8/2005 | Stam et al. |
| 6,941,216 | B2 | 9/2005 | Isogai et al. |
| 6,946,978 | B2 | 9/2005 | Schofield |
| 6,968,266 | B2 | 11/2005 | Ahmed-Zaid et al. |
| 7,005,974 | B2 | 2/2006 | McMahon et al. |
| 7,038,577 | B2 | 5/2006 | Pawlicki et al. |
| 7,049,945 | B2 | 5/2006 | Breed et al. |
| 7,151,844 | B2 | 12/2006 | Stevenson et al. |
| 7,188,963 | B2 | 3/2007 | Schofield et al. |
| 7,295,682 | B2 | 11/2007 | Otsuka et al. |
| 7,370,983 | B2 | 5/2008 | DeWind et al. |
| 7,388,475 | B2 | 6/2008 | Litkouhi |
| 7,391,014 | B2 | 6/2008 | Saccagno |
| 7,420,592 | B2 | 9/2008 | Freeman |
| 7,463,138 | B2 | 12/2008 | Pawlicki et al. |
| 7,526,103 | B2 | 4/2009 | Schofield et al. |
| 7,565,006 | B2 | 7/2009 | Stam et al. |
| 7,720,580 | B2 | 5/2010 | Higgins-Luthman |
| 7,764,808 | B2 | 7/2010 | Zhu et al. |
| 7,877,175 | B2 | 1/2011 | Higgins-Luthman |
| 7,991,522 | B2 | 8/2011 | Higgins-Luthman |
| 8,116,929 | B2 | 2/2012 | Higgins-Luthman |
| 8,239,086 | B2 | 8/2012 | Higgins-Luthman |
| 8,386,114 | B2 | 2/2013 | Higgins-Luthman |
| 2002/0003571 | A1 | 1/2002 | Schofield et al. |
| 2002/0159270 | A1 | 10/2002 | Lynam et al. |
| 2002/0188392 | A1 | 12/2002 | Breed et al. |
| 2003/0025597 | A1 | 2/2003 | Schofield |
| 2003/0052773 | A1 | 3/2003 | Sjonell |
| 2003/0156015 | A1 | 8/2003 | Winner et al. |
| 2003/0169522 | A1 | 9/2003 | Schofield et al. |
| 2003/0236622 | A1 | 12/2003 | Schofield |
| 2004/0149504 | A1 | 8/2004 | Swoboda et al. |
| 2005/0232469 | A1 | 10/2005 | Schofield et al. |
| 2006/0050018 | A1 | 3/2006 | Hutzel et al. |
| 2006/0125919 | A1 | 6/2006 | Camilleri et al. |
| 2006/0164230 | A1 | 7/2006 | DeWind et al. |
| 2006/0171704 | A1 | 8/2006 | Bingle et al. |
| 2008/0144924 | A1 | 6/2008 | Hoffmann |
| 2010/0002071 | A1 | 1/2010 | Ahiska |

FOREIGN PATENT DOCUMENTS

| | | |
|---|---|---|
| EP | 0132151 A1 | 1/1985 |
| EP | 0354261 A1 | 2/1990 |
| EP | 0591743 A1 | 4/1994 |
| EP | 0755524 B1 | 10/1995 |
| EP | 1710749 | 10/2006 |
| JP | 01-281600 | 11/1989 |
| JP | 03-097080 | 4/1991 |
| JP | 03-203000 | 9/1991 |
| JP | 05-062099 | 3/1993 |
| JP | 2003-087781 | 3/2003 |
| JP | 2003-329439 | 11/2003 |
| JP | 2005-039599 | 2/2005 |
| WO | WO 2007/049266 | 5/2007 |
| WO | WO 2010/038224 | 4/2010 |

OTHER PUBLICATIONS

Van Leeuwen et al., "Requirements for Motion Estimation in Image Sequences for Traffic Applications", IEEE, US, vol. 1, May 24, 1999, pp. 145-150, XP010340272.

Van Leeuwen et al., "Motion Estimation with a Mobile Camera for Traffic Applications", IEEE, US, Oct. 3, 2000, pp. 58-63.

Van Leeuwen et al., "Motion Interpretation for In-Car Vision Systems", IEEE, US, vol. 1, Sep. 30, 2002, pp. 135-140.

Van Leeuwen et al., "Motion Estimation in Image Sequences for Traffic Applications", vol. 1, May 1, 2000, pp. 354-359, XP002529773.

Pratt, "Digital Image Processing, Passage—ED.3", John Wiley & Sons, US, Jan. 1, 2001, pp. 657-659, XP002529771.

Supplemental European Search Report completed May 29, 2009, from corresponding European Application No. EP 03 72 1946.

Hicks et al., "Panoramic Electronic Rear Vision for Automotive Applications", Society of Automotive Engineers (SAE). Mar. 1-4, 1999, 1999-01-0655.

J. Borenstein et al., "Where am I? Sensors and Method for Mobile Robot Positioning", University of Michigan, Apr. 1996, pp. 2, 125-128.

Bow, Sing T., "Pattern Recognition and Image Preprocessing (Signal Processing and Communications)", CRC Press, Jan. 15, 2002, pp. 557-559.

Vlacic et al., (Eds), "Intelligent Vehicle Technologies, Theory and Applications", Society of Automotive Engineers Inc., edited by SAE International, 2001.

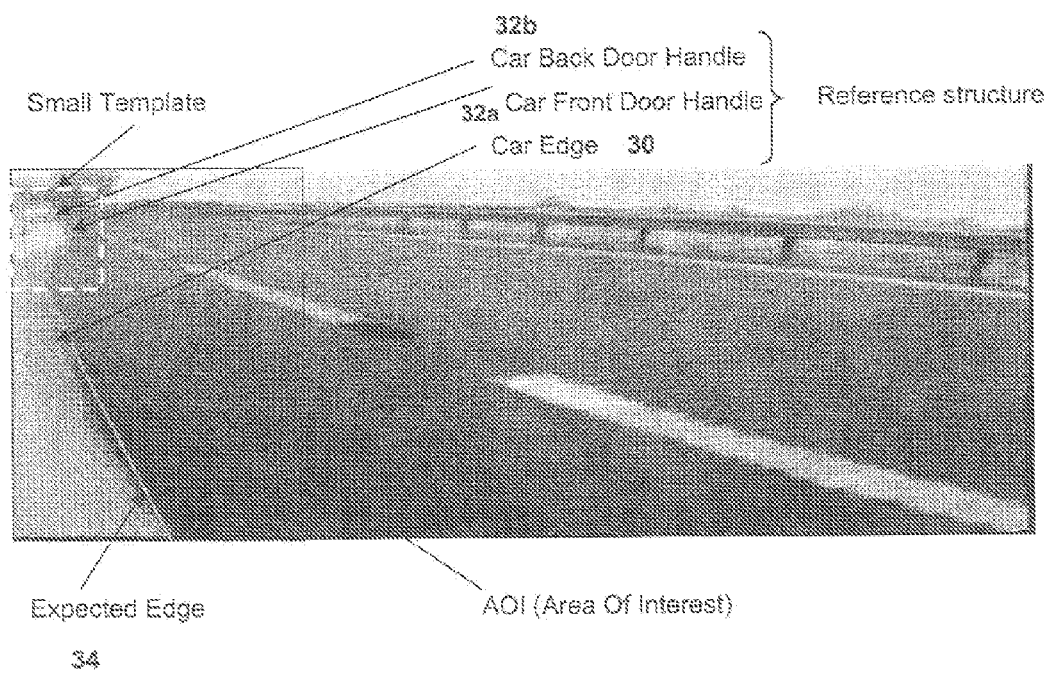
FIG. 2
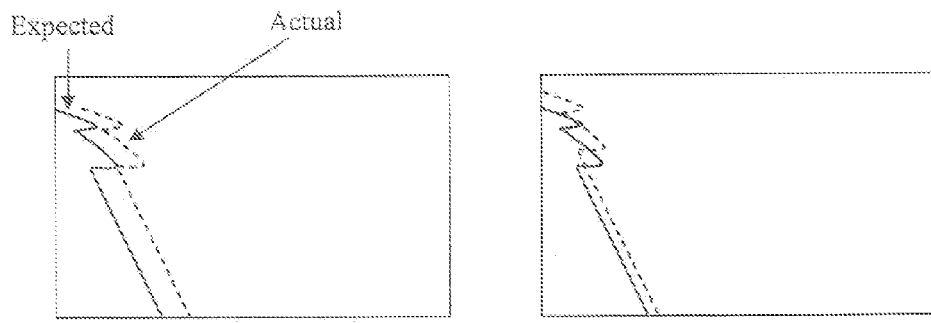
FIG. 3A
FIG. 3B

Rotation (Roll)

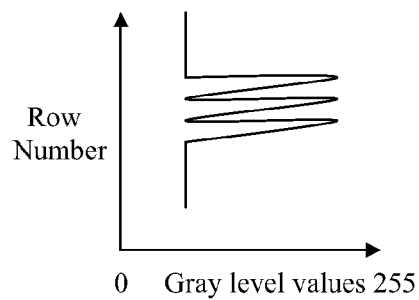
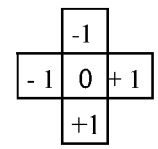
FIG. 12            FIG. 13
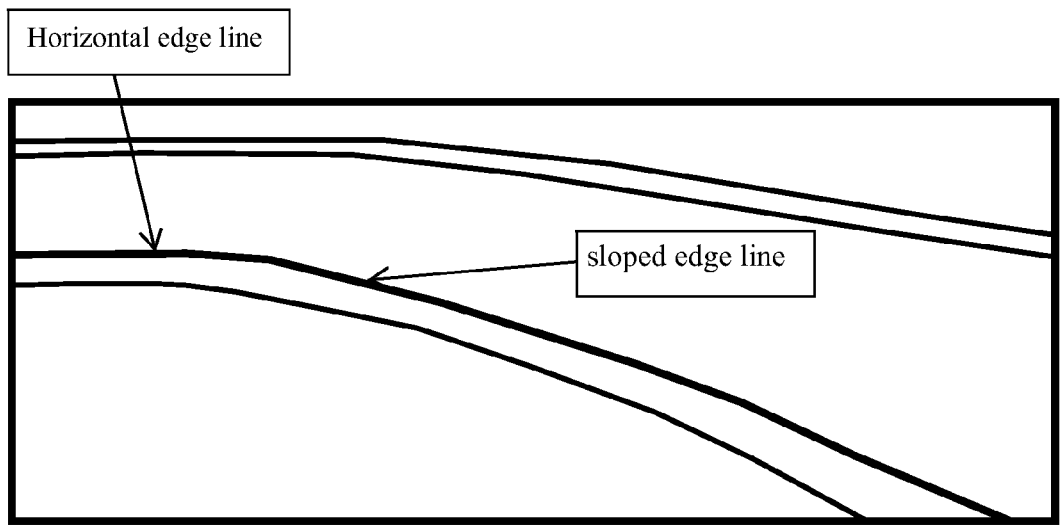
FIG. 14

IMAGING SYSTEM FOR VEHICLE

CROSS REFERENCE TO RELATED APPLICATIONS

The present application is a continuation of U.S. patent application Ser. No. 13/566,266, filed Aug. 3, 2012, now U.S. Pat. No. 8,386,114, which is a continuation of U.S. patent application Ser. No. 13/370,694, filed Feb. 10, 2012, now U.S. Pat. No. 8,239,086, which is a continuation of U.S. patent application Ser. No. 13/190,931, filed Jul. 26, 2011, now U.S. Pat. No. 8,116,929, which is a continuation of U.S. patent application Ser. No. 12/979,497, filed Dec. 28, 2010, now U.S. Pat. No. 7,991,522, which is a continuation of U.S. patent application Ser. No. 12/764,355, filed Apr. 21, 2010, now U.S. Pat. No. 7,877,175, which is a continuation of U.S. patent application Ser. No. 11/315,675, filed Dec. 22, 2005, now U.S. Pat. No. 7,720,580, which claims benefit of U.S. provisional application Ser. No. 60/638,687, filed Dec. 23, 2004, which is hereby incorporated herein by reference in its entirety.

FIELD OF THE INVENTION

The present invention relates generally to vision or imaging systems for vehicles and is related to object detection systems and, more particularly, to imaging systems which are operable to determine if a vehicle or object of interest is adjacent to, forward of or rearward of the subject vehicle to assist the driver in changing lanes or parking the vehicle. The present invention also relates generally to a lane departure warning system for a vehicle

BACKGROUND OF THE INVENTION

Many lane change aid/side object detection/lane departure warning devices or systems and the like have been proposed which are operable to detect a vehicle or other object that is present next to, ahead of or rearward of the equipped vehicle or in an adjacent lane with respect to the equipped vehicle. Such systems typically utilize statistical methodologies to statistically analyze the images captured by a camera or sensor at the vehicle to estimate whether a vehicle or other object is adjacent to the equipped vehicle. Because such systems typically use statistical methodologies to determine a likelihood or probability that a detected object is a vehicle, and for other reasons, the systems may generate false positive detections, where the system indicates that a vehicle is adjacent to, forward of or rearward of the subject vehicle when there is no vehicle adjacent to, forward of or rearward of the subject vehicle, or false negative detections, where the system, for example, indicates that there is no vehicle adjacent to the subject vehicle when there actually is a vehicle in the adjacent lane.

Such known and proposed systems are operable to statistically analyze substantially all of the pixels in a pixelated image as captured by a pixelated image capture device or camera. Also, such systems may utilize algorithmic means, such as flow algorithms or the like, to track substantially each pixel or most portions of the image to determine how substantially each pixel or most portions of the image has changed from one frame to the next. Such frame by frame flow algorithms and systems may not be able to track a vehicle which is moving at generally the same speed as the equipped vehicle, because there may be little or no relative movement between the vehicles and, consequently, little or no change from one frame to the next. Because the systems may thus substantially continuously analyze substantially every pixel for substantially every frame captured and track such pixels and frames from one frame to the next, such systems may require expensive processing controls and computationally expensive software to continuously handle and process substantially all of the data from substantially all of the pixels in substantially each captured image or frame.

Many automotive lane departure warning (LDW) systems (also known as run off road warning systems) are being developed and implemented on vehicles today. These systems warn a driver of a vehicle when their vehicle crosses the road's land markings or when there is a clear trajectory indicating they will imminently do so. The warnings are typically not activated if the corresponding turn signal is on, as this implies the driver intends to make a lane change maneuver. Additionally, the warning systems may be deactivated below a certain vehicle speed. The driver interface for these systems may be in the form of a visual warning (such as an indicator light) and/or an audible warning (typically a rumble strip sound). One application warns a driver with an indicator light if the vehicle tire is crossing the lane marker and no other vehicle is detected in the driver's corresponding blind spot; and/or further warns the driver with an audible warning if the vehicle is crossing into the adjacent lane and there is a vehicle detected in the driver's blind spot.

There is concern that the current systems will be more of a driver annoyance or distraction than will be acceptable by the consumer market. Using the turn signal as the principle means of establishing to the warning system that the maneuver is intentional does not reflect typical driving patterns and, thus, many intended maneuvers will cause a warning. As a driver gets annoyed by warnings during intended maneuvers, the driver will likely begin to ignore the warnings, which may result in an accident when the warning is appropriate.

Therefore, there is a need in the art for an object detection system, such as a blind spot detection system or lane change assist system or lane departure warning system or the like, which overcomes the short comings of the prior art.

SUMMARY OF THE INVENTION

The present invention is intended to provide an object detection system, such as a blind spot detection system, a lane change assist or aid system or device, a lane departure warning system, a side object detection system, a reverse park aid system, a forward park aid system, a forward, sideward or rearward collision avoidance system, an adaptive cruise control system, a passive steering system or the like, which is operable to detect and/or identify a vehicle or other object of interest at the side, front or rear of the vehicle equipped with the object detection system. The object detection system of the present invention, such as for a lane change assist system, utilizes an edge detection algorithm to detect edges of objects in the captured images and determines if a vehicle is present in a lane adjacent to the equipped or subject vehicle in response to various characteristics of the detected edges, such as the size, location, distance, intensity, relative speed and/or the like. The system processes a subset of the image data captured which is representative of a target zone or area of interest of the scene within the field of view of the imaging system where a vehicle or object of interest is likely to be present. The system processes the detected edges within the image data subset to determine if they correspond with physical characteristics of vehicles and other objects to determine whether the detected edge or edges is/are part of a vehicle or a significant edge or object at or toward the subject vehicle. The system utilizes various filtering mechanisms, such as algorithms executed in software by a system microprocessor, to substantially eliminate or substantially ignore edges or pixels that are not or cannot be indicative of a vehicle or significant object to reduce the processing requirements and to reduce the possibility of false positive signals.

The object detection system of the present invention may capture images at a side of the vehicle and may process various windows of the images to detect a vehicle in the adjacent lane or other object, such as a bicycle, in the adjacent lane. The system may adjust the image processing to account for misalignment of the camera at the side of the vehicle. The system may adjust the area or zone of interest in response to a turning of the vehicle's wheels, such as when the vehicle is turning or curving along a curve in the road. The system may distinguish between vehicles or other objects and shadows of objects/vehicles so that a shadow of a vehicle two lanes over may not be considered a vehicle in the adjacent lane. The system may switch between daytime and nighttime algorithms and may be operable to detect headlamps of vehicles in the adjacent lane.

According to an aspect of the present invention, an imaging system for a vehicle includes an imaging array sensor and a control. The image array sensor comprises a plurality of photo-sensing pixels and is positioned at the vehicle with a field of view exteriorly of the vehicle. The imaging array sensor is operable to capture an image of a scene occurring exteriorly of the vehicle. The captured image comprises an image data set representative of the exterior scene. The control algorithmically processes the image data set to a reduced image data set of the image data set. The control processes the reduced image data set to extract information from the reduced image data set. The control selects the reduced image data set based on a steering angle of the vehicle.

Optionally, the control may process the reduced image data set with an edge detection algorithm to extract information from the reduced image data set. The image sensor may be one of (a) part of an exterior rearview mirror assembly of the vehicle and with a field of view at least partially sideward of the vehicle, and (b) at an upper windshield area and behind the windshield of the vehicle and with a field of view forward and through the windshield (such as at an area that is cleaned by the windshield wiper or wipers of the vehicle when the windshield wipers are activated). Optionally, the image sensor may be part of an exterior rearview mirror assembly of the vehicle and with a field of view at least partially sideward of the vehicle, wherein the imaging system comprises a side object detection system for detecting objects at a side of the vehicle. Optionally, the image sensor may be at an upper windshield area and behind the windshield of the vehicle and with a field of view forward and through the windshield, wherein the imaging system comprises a lane departure warning system.

Therefore, the present invention provides an imaging system for use as or in association with a side object detection system and/or a lane departure warning system. The system is operable to process captured image data of a scene occurring exteriorly and along one or both sides of the vehicle to determine if a target vehicle or object of interest is located at or in the lane adjacent to the subject or host vehicle. The imaging system of the present invention may process zones or areas of interest in the captured images and may adjust processing to accommodate any misalignment of the camera that may occur during installation of the camera at the side of the vehicle. The side object detection system may also select or adjust the image processing to select/adjust the areas of interest, such as in response to a steering angle of the vehicle, such as a turning of the wheels of the vehicle, so that the zone or area is adapted for the turning of the subject vehicle. The imaging system of the present invention thus provides enhanced processing of captured images to provide the desired function of the imaging system or associated control or control system or alert system.

These and other objects, advantages, purposes and features of the present invention will become apparent upon review of the following specification in conjunction with the drawings.

BRIEF DESCRIPTION OF THE DRAWINGS

FIG. 2 is a representation of a captured image of a side area of a vehicle as captured by an imaging sensor in accordance with the present invention;

FIGS. 3A-C are schematics of the captured image of FIG. 2 showing the adjustments that may be made to the image processing to account for misalignment of the image sensor;

FIG. 12 is a plot of the gray level values of the rows of pixels as a result of a wide line integration in accordance with the present invention;

FIG. 13 is a processing mask for processing the windows of the captured images using gradient calculations in accordance with the present invention;

FIG. 14 is a representation of a captured image showing the shadow of the vehicle in the area adjacent to the vehicle;

DESCRIPTION OF THE PREFERRED EMBODIMENTS

Figure 1:
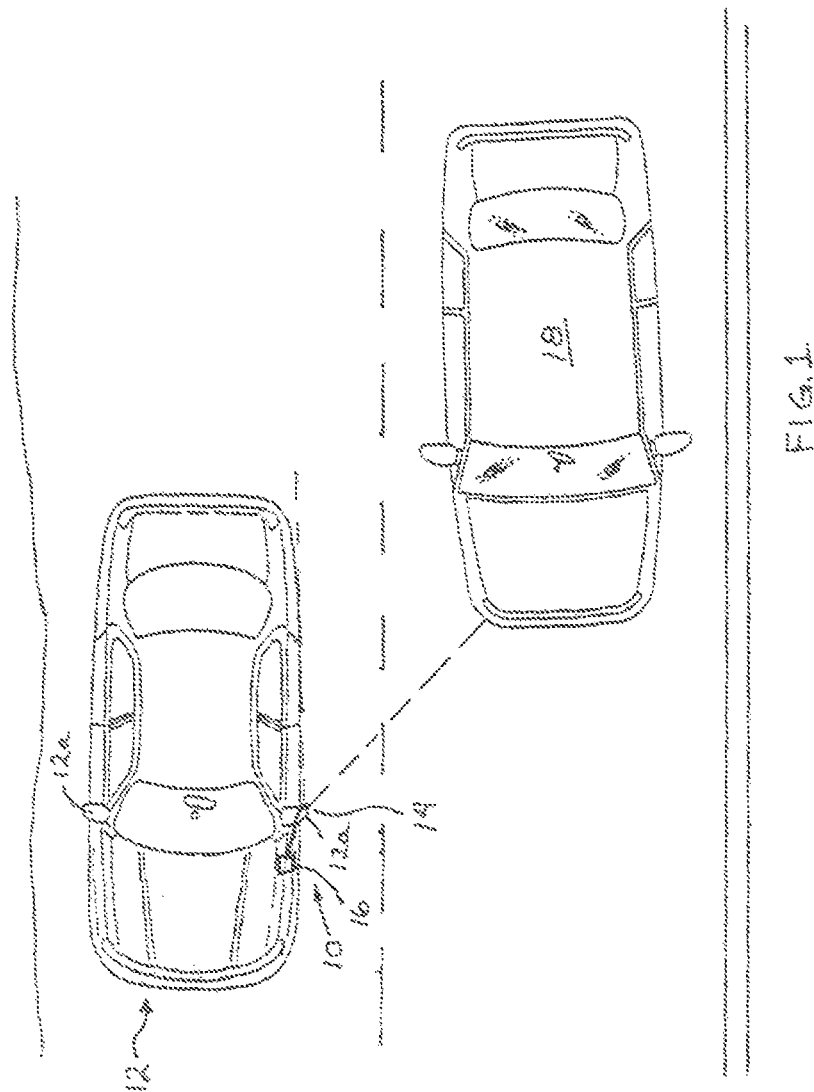
FIG. 1 is a top plan view of a vehicle incorporating the object detection system of the present invention.

Referring now to the drawings and the illustrative embodiments depicted therein, an object detection system or imaging system, such as a lane change assist or aid system 10, is positioned at a vehicle 12 (such as at an exterior rearview mirror 12a of a vehicle) and is operable to capture an image of a scene occurring sidewardly and rearwardly at or along one or both sides of vehicle 12 (FIG. 1). Lane change assist system 10 comprises an image capture device or sensor or camera 14, which captures an image of the scene occurring toward a respective side of the vehicle 12, and a control 16, which processes the captured image to determine whether another vehicle 18 is present at the side of vehicle 12, as discussed below. Control 16 may be further operable to activate a warning indicator or display or signal device to alert the driver of vehicle 12 that another vehicle is present at the side of vehicle 12. The warning or alert signal may be provided to the driver of vehicle 12 in response to another vehicle being detected at the blind spot area (as shown in FIG. 1) and may only be provided when the driver of vehicle 12 actuates a turn signal toward that side or begins turning the subject vehicle 12 toward that side to change lanes into the lane occupied by the other detected vehicle 18. The control and imaging system may utilize aspects described in U.S. patent application Ser.

No. 10/427,051, filed Apr. 30, 2003, now U.S. Pat. No. 7,038,577, which is hereby incorporated herein by reference. Reference is made to U.S. patent application Ser. No. 10/427,051, for a discussion of image processing techniques and control functions useful with the present invention.

Optionally, the imaging system and object detection system of the present invention may utilize aspects of the imaging systems or detection systems of the types described in U.S. Pat. Nos. 5,929,786 and/or 5,786,772, and/or U.S. patent application Ser. No. 10/427,051, filed Apr. 30, 2003, now U.S. Pat. No. 7,038,577; and/or Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; and/or Ser. No. 60/618,686, filed Oct. 14, 2004, or of the reverse or backup aid systems, such as rearwardly directed vehicle vision systems utilizing principles disclosed in U.S. Pat. Nos. 5,550,677; 5,760,962; 5,670,935; 6,201,642; 6,396,397; 6,498,620; 6,717,610 and/or 6,757,109, and/or U.S. patent application Ser. No. 10/418,486, filed Apr. 18, 2003, now U.S. Pat. No. 7,005,974, or of automatic headlamp controls, such as the types described in U.S. Pat. Nos. 5,796,094 and/or 5,715,093; and/or U.S. patent application Ser. No. 11/105,757, filed Apr. 14, 2005, now U.S. Pat. No. 7,526,103; and U.S. provisional applications, Ser. No. 60/607,963, filed Sep. 8, 2004; and Ser. No. 60/562,480, filed Apr. 15, 2004, or of rain sensors, such as the types described in U.S. Pat. Nos. 6,250,148 and 6,341,523, or of other imaging systems, such as the types described in U.S. Pat. Nos. 6,353,392 and 6,313,454, which may utilize various imaging sensors or imaging array sensors or cameras or the like, such as a CMOS imaging array sensor, a CCD sensor or other sensors or the like, such as the types disclosed in commonly assigned, U.S. Pat. Nos. 5,550,677; 5,760,962; 6,097,023 and 5,796,094, and U.S. patent application Ser. No. 09/441,341, filed Nov. 16, 1999, now U.S. Pat. No. 7,339,149, and/or PCT Application No. PCT/US2003/036177 filed Nov. 14, 2003, published Jun. 3, 2004 as PCT Publication No. WO 2004/047421, with all of the above referenced U.S. patents, patent applications and provisional applications and PCT applications being commonly assigned and being hereby incorporated herein by reference.

The image sensor may be located at the vehicle so as to have a sideward field of view, such as at an exterior rearview mirror of the vehicle, such as generally or at least partially within an exterior rearview mirror of the vehicle. For example, an image sensor may be located within an exterior rearview mirror assembly of the vehicle and may have a generally rearwardly and sidewardly field of view through a transflective reflective element of the exterior rearview mirror assembly. In such an application, the image sensor may be incorporated in or associated with a side object detection system that detects objects at a side or blind spot area of the controlled or subject vehicle. Optionally, the image sensor may have a generally forward field of view to capture images of a scene occurring forwardly of the vehicle. The image sensor may be located within the vehicle cabin and rearward of the windshield so as to have a field of view forwardly and through the windshield of the vehicle, preferably at a location that is cleaned by the windshield wipers of the vehicle, such as at an interior rearview mirror assembly of the vehicle or at an accessory module or windshield electronics module or the like. In such an application, the image sensor may be incorporated in or associated with a lane departure warning system that detects a departure of the controlled or subject vehicle from a lane as the vehicle travels along a road.

Camera Calibration:

In order to verify that the camera or imaging sensor is mounted at the vehicle (such as at an exterior portion of the vehicle) within a desired tolerance limit so as to provide the desired field of view, the camera may detect the side of the vehicle (shown at 30 in FIG. 2) and/or the door handle or handles (the front door handle is shown at 32*a* in FIG. 2, while the rear door handle is shown at 32*b* in FIG. 2) of the vehicle and the control may confirm that they are in the expected location in the captured images. If the control determines that the camera is not aligned or aimed at the desired location (such as by determining that the vehicle edge and/or door handle/handles are not at the expected location), the control may adjust the image and/or image processing to account for any such misalignment of the camera. For example, the degree of misalignment may be calculated, and the image processing may be adjusted or shifted and/or rotated to position the reference structure at the appropriate location in the captured images.

Figure 3C:
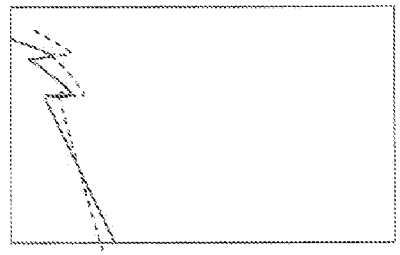

For example, the algorithm may function to preprocess the captured image by a histogram equalization to improve the image contrast. The algorithm may then process the captured images via an edge detection in the area of interest to extract the expected edge of the vehicle (shown at 34 in FIG. 2). The algorithm may filter the image data to remove noise in the edge detected image. The algorithm may perform a coarse structure fitting (such as via a line fitting algorithm or contour fitting algorithm or the like) of the vehicle side and door handles in the captured image for verifying the camera mounting is within the desired or appropriate tolerance limit. The algorithm may further perform a fine structure fitting (such as via a correlation algorithm or contour fitting algorithm or the like) for calculating shift in yaw, pitch and roll. As shown in FIGS. 3A-C, the actual or detected vehicle edges may be misaligned or separated from the expected vehicle edges, such that the image processing may be adjusted to shift the captured image data accordingly to accommodate such misalignment of the camera. Based on the results of the image processing techniques, data or information of the yaw, pitch and roll may be used to set the polygon co-ordinates and H depression pixel calibration parameters, so that the expected vehicle edges are substantially aligned with the actual or detected vehicle edges.

After the image data or image processing is adjusted to account for any misalignment of the camera at the vehicle, the camera may capture images of the scene occurring exteriorly of the vehicle and at that side of the vehicle, and the control may process the images to detect objects or lane markers or the like at the side of the vehicle and/or rearward of the vehicle, and may utilize aspects described in U.S. patent application Ser. No. 10/427,051, filed Apr. 30, 2003, now U.S. Pat. No. 7,038,577, which is hereby incorporated herein by reference.

Figure 4:
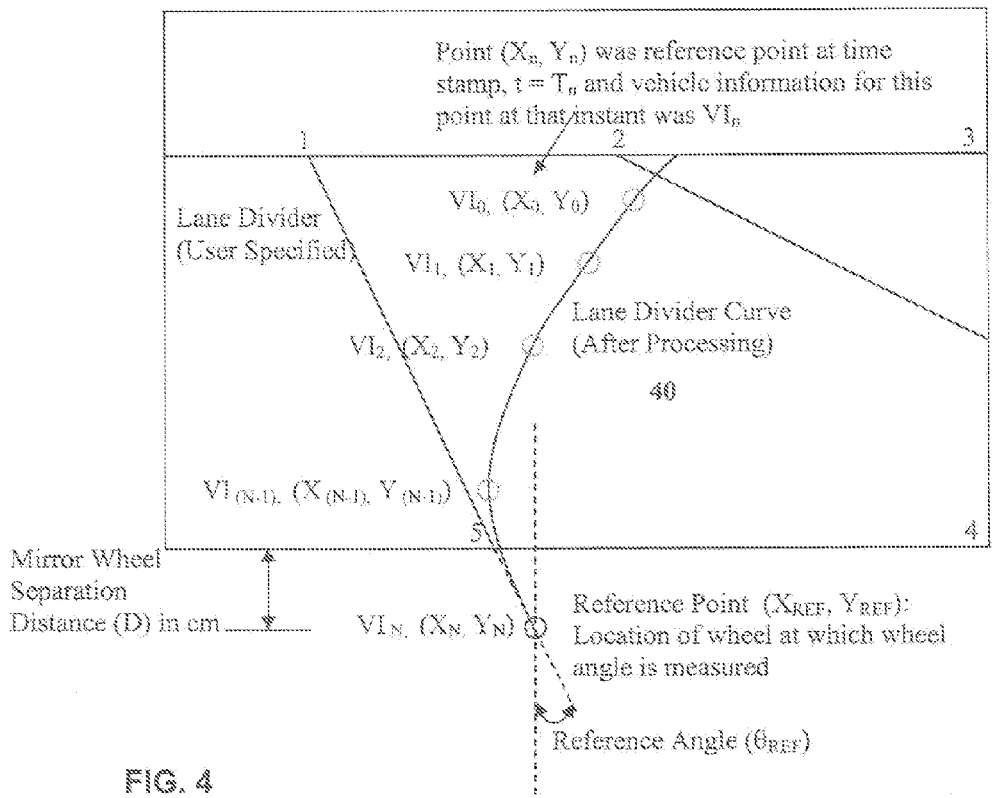
FIG. 4 is a schematic showing an adjustment of the area of interest when the wheels of the subject vehicle are turned.
Figure 5:
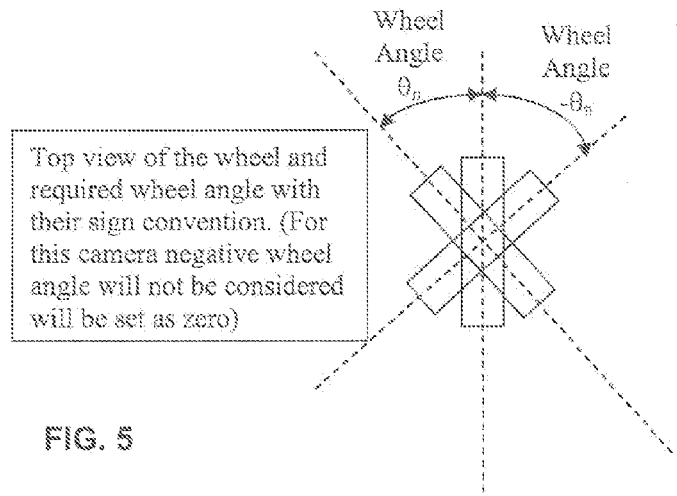
FIG. 5 is a plan view of one of the wheels of the subject vehicle showing the angles of the wheel as it is turned.
Figure 6:
FIGS. 6-9 are representations of captured images of the side area of the vehicle, showing how different shadows may be detected.
Figure 7:
Figure 8:
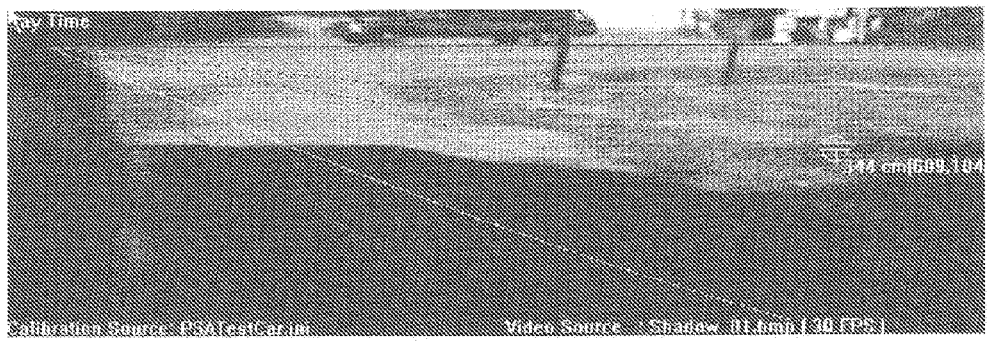

Adjustment of Zone when Vehicle Turning:

Optionally, the control may perform a curve processing or lane divider curve fitting function to select or adjust the reduced image set or zone of interest based on a steering angle of the vehicle (the angle at which the vehicle is steered to either side relative to the longitudinal axis of the vehicle), such as when the front wheels of the subject vehicle are turned. The curve processing function may adjust the zone of interest based on the degree of turning of the steering wheel (or other characteristic indicative of the steering angle of the vehicle) so that areas or regions outside of a revised curve may not be processed or considered as much as the areas or regions within the revised curve. Based on the history of host vehicle information (such as vehicle speed and wheel angle), the control may modify the slope of the adjacent lane divider (at the left side of user specified area of interest) at different positions. As shown in FIG. 4, when the wheels are turned at an angle θ, the control may determine a new curved line 40 that represents the edge of the zone or area of interest. This modification will convert straight line 1-5 in FIG. 4 to the curve 40. Detected targets or objects outside this curve (i.e., to the left of the curve in FIG. 4) will not be considered for the mapping or object detection. As shown in FIG. 5, the wheel angle may be determined by the rotation or pivoting or turning of the front wheels of the vehicle about their generally vertical axis (which may be detected by a rotational measuring device or the like), and the curve may be adjusted as a function of the vehicle speed (such as determined via a wheel speed sensor or the like) and the wheel angle θ.

The following vehicle information history table (VIHT) with the history of multiple (N) frames or captured images may be maintained for fitting of a curve. The table may be updated when the vehicle information is available for each frame.

| Frame Index/ Time Stamp | Host Vehicle Information ($VI_n$) | | Cumulative Wheel | Point on Curvature (cm) | | Point on Curvature (pixels) | |
|---|---|---|---|---|---|---|---|
| | Speed | Wheel Angle | | | | | |
| $T_n$ | $V_n$ | $\theta_n$ | Angle $\theta_{Cn}$ | $X_n$ | $Y_n$ | $X_{Pn}$ | $Y_{Pn}$ |
| $T_0$ | $V_0$ | $\theta_0$ | $\theta_{C0}$ | $X_0$ | $Y_0$ | $X_{P0}$ | $Y_{P0}$ |
| $T_1$ | $V_1$ | $\theta_1$ | $\theta_{C1}$ | $X_1$ | $Y_1$ | $X_{P1}$ | $Y_{P1}$ |
| $T_2$ | $V_2$ | $\theta_2$ | $\theta_{C2}$ | $X_2$ | $Y_2$ | $X_{P2}$ | $Y_{P2}$ |
| . | . | . | . | . | . | . | . |
| $T_{N-1}$ | $V_{N-1}$ | $\theta_{N-1}$ | $\theta_{C(N-1)}$ | $X_{N-1}$ | $Y_{N-1}$ | $X_{P(N-1)}$ | $Y_{P(N-1)}$ |
| $T_N$ | $V_N$ | $\theta_N$ | $\theta_{CN}=\theta_{REF}$ | $X_N=X_{REF}$ | $Y_N=Y_{REF}$ | $X_{PN}$ | $Y_{PN}$ |

During operation, the control may perform the following computations:
1. Compute Reference Angle ($\theta_{REF}$) using polygon vertices (1 & 5).
2. Compute Reference Point ($X_{REF}, Y_{REF}$) using Reference Angle ($\theta_{REF}$) and Mirror Wheel Separation Distance (D).
3. For each frame update (add in the circular buffer) following VIHT entries:
   a. Frame Index or Time Stamp ($T_n$);
   b. Host Vehicle Speed ($V_n$); and
   c. Host Vehicle Wheel Angle ($\theta_n$) (note that this angle may be considered without doing any perspective correction, but may require appropriate correction to be added based on height and angle of inclination of the camera).
4. Compute Cumulative Wheel Angle ($\theta_{Cn}$):

$\theta_{CN}=\theta_{REF}$;

$\theta_{C(N-1)}=\theta_{N-1}+\theta_{CN}$;

$\theta_{C(N-2)}=\theta_{N-2}+\theta_{C(N-1)}$;

$\theta_{C(N-3)}=\theta_{N-3}+\theta_{C(N-2)}$;

.
.
.

$\theta_{C0}=\theta_0+\theta_{C1}$.

5. Compute curve points ($X_n, Y_n$) (such as in cm):
   The n=N curve point is a reference point and for all other points the following equations may be used to compute the curve points:

$Y_{N-1}=F1(T_{N-1}, V_{N-1}, Y_N)$; and $X_{N-1}=F2(\theta_{C(N-1)}, Y_{N-1}, X_N, Y_N)$.

Preferably, the functions F1 and F2 are relatively simple trigonometric functions.
6. Replace the curve point ($X_0, Y_0$) with the intersection point of the curve and the horizon, and preferably do not allow the curve to cross the horizon.
7. For display purposes, compute the curve points ($X_{Pn}, Y_{Pn}$) in pixels using the existing cm-pixel relations (CMDistances and PixelSomethingThreshold)

In a preferred embodiment, the steps 1 and 2 above may be a one time computation in the initialization part of the algorithm, while the steps 3-6 are preferably executed during the run-time of the system, and the step 7 preferably is executed in the debug mode for the testing.

Vertical Edge Detection:

Optionally, the object detection system may be operable to detect vertical edges of objects in the field of view of the camera. Such an approach may be useful in detecting target vehicles when the front of the target vehicle is not visible, such as when the target vehicle is alongside the subject vehicle.

The vertical edge detection algorithm may be performed first at a low level Processing. During such low level processing, the vertical edge detection may be applied to an input image, and a noise filtering algorithm may be applied to the edge image. The lateral X histogram may be calculated and analyzed, and any non-significant edge counts may be removed from the histogram. The histogram may be normalized and analyzed to identify probable targets, a different ID may be given for a vertical edge detected target for use during high level processing.

During the high level processing, a map of target information for vertical targets may be generated, such as in a similar manner as for horizontal edge detected targets (such as described in U.S. patent application Ser. No. 10/427,051, filed Apr. 30, 2003, now U.S. Pat. No. 7,038,577, which is hereby incorporated herein by reference, and such as described below). The targets may be filtered out based on various criteria (such as relative speed, number of frames present and/or the like), and a warning may be raised or generated if the object is detected at the side of the vehicle.

Such vertical edge detection functions may be desirable, since a target vehicle's trunk may generate a significant vertical edge. Also, the vertical edges may substantially always be present in both the daytime and nighttime hot zones. Furthermore, tree shadows, lane markings and other structures may be filtered out using such vertical edge detection.

Qualification During Daytime:

Side Object Detection works based on the edges detected. Horizontal edges are used to detect and track vehicle. The detected edges are qualified based on a robust high level vision algorithm, such as the algorithms described in U.S. patent application Ser. No. 10/427,051, filed Apr. 30, 2003, now U.S. Pat. No. 7,038,577, which is hereby incorporated herein by reference. Vertical edges are being used to detect vehicles close to the camera/passing vehicles, as discussed above.

However, the vehicle identification may be based on the shadow created by the vehicle (for day time operation). A detected shadow could be created by a target vehicle entering into the blind spot or static objects like guard rails or structures on the road side or by the self shadow (of the subject vehicle) or of vehicles passing more than one lane away. It is difficult to identify whether or not the shadow is by a target vehicle entering into the blind spot. Thus, a positive identification or qualification of the edges can help in reducing false alarms.

Figure 9:
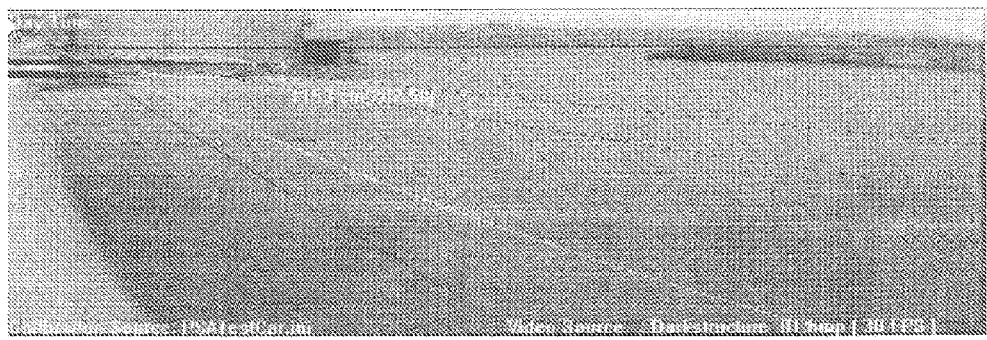

When a shadow is detected, it is either a shadow created by a vehicle entering into the blind spot, or a shadow created by something else and not the target vehicle (a vehicle entering the blind spot). Referring to FIGS. 6-9, different shadows are shown for different scenarios the system may encounter, such as, for example, the shadow cast by a truck that is one or more lanes over from the target lane (FIG. 6), shadows cast by trees alongside the road (FIG. 7), the shadow cast by the subject vehicle (FIG. 8), and/or dark structures (FIG. 9).

In the case where the shadow is created by something other than the target vehicle, the following characteristics may be assumed:
1. Below the edge (for horizontal edges) the road may have full illumination by daylight, and above the horizontal edge there will be road where daylight is partially occluded by some objects (so lesser illumination); or
2. Below the edge the road may be darker because of partial occlusion by some object causing the shadow, and above the edge the road may have full daylight illumination;
3. The above two scenarios are similar for the areas to the left and right of a vertical shadow.

Therefore, the following characteristics can also be assumed:
1. Above and below the edges there is road;
2. To the left and right of a vertical edge there is road;
3. One side of the edge is not road but is a vehicle.

The problem is that it has heretofore been difficult to distinguish between the shadow and the vehicle. The proposed methodology is intended to increase the confidence in decision. For example, the situations in FIGS. 6 and 7 may cause the system to indicate that it is a false positive (host or self shadow removal (discussed below) will also be resolved), while the situation in FIG. 8 may cause the system to indicate that the edge is due to a vehicle. The situation in FIG. 9 may result in the system indicating that it could not decide so the existing algorithm should continue to process the images.

In order to qualify a detected edge, the system of the present invention may perform the following processing steps:
1. Histogram Analysis:
    display the edge pixels within the hot zone;
    determine the start and the endpoint of an edge;
    create processing windows on either side of the edge; and
    perform wide line integration.

Figure 10:
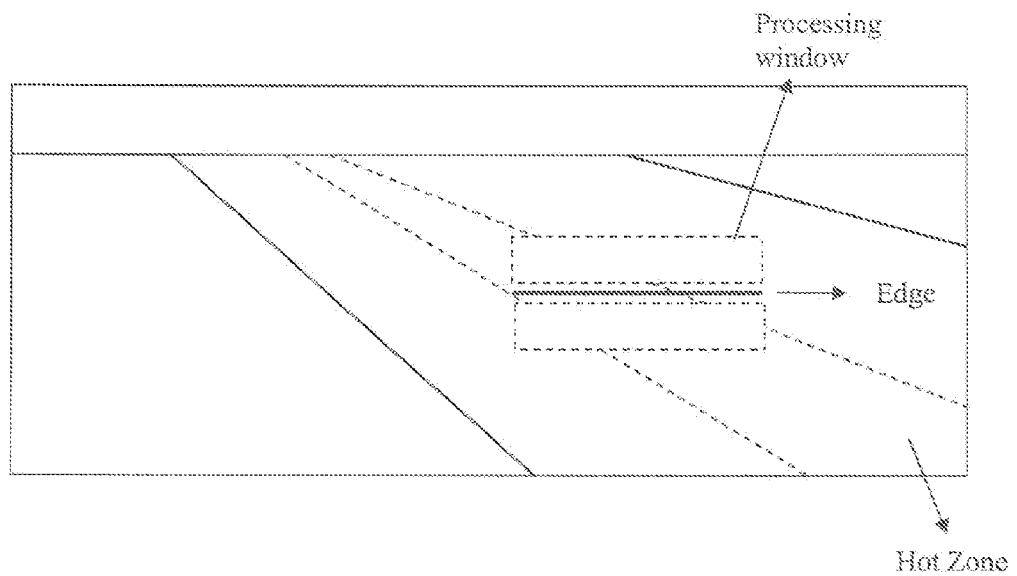
FIG. 10 is a schematic of the image processing windows useful in processing the captured images in accordance with the present invention.
Figure 11:
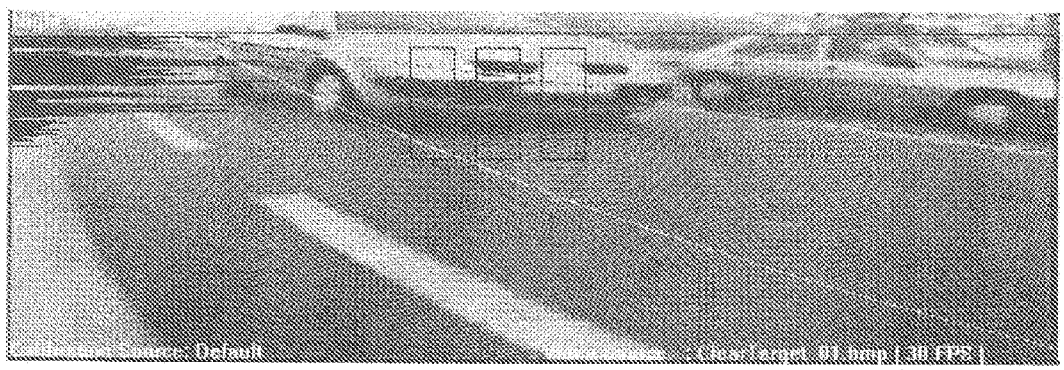
FIG. 11 is a representation of a captured image of the side area of the vehicle, showing different processing windows used to detect the vehicle in the adjacent lane.

For Example, and as shown in FIGS. 10 and 11, a plurality of processing windows may be applied at either side of a detected edge. A plot as a result of the wide line integration is expected to be as shown in FIG. 12. The variations in the plot are expected to provide insight in qualifying an edge.
2. Extracting unique features across the edge (mean and range):
    display the edge pixels within the hot zone;
    determine the start and the endpoint of an edge;
    estimate unique features to qualify an edge such as mean and range; and
    analyze variations in mean and range on either side of the edge.

Comparison of the mean and range of the processing windows across a detected edge is expected to give insight in qualifying an edge.
3. Gradient analysis across the detected horizontal edge:
    display the edge pixels within the hot zone;
    determine the start and the endpoint of an edge;
    gradient calculations are done on the processing windows using local window operators, such as Sobel operators of the mask shown in FIG. 13; and
    The gradient magnitude gives the amount of the difference between pixels in the neighborhood (the strength of the edge). The gradient orientation gives the direction of the greatest change, which presumably is the direction across the edge (the edge normal). Comparison of the gradient across the edge is expected to provide insight in qualifying an edge.

Host Shadow Removal:

In side object detection, the host shadow of the vehicle may be detected as a target vehicle if the host shadow is extended in the hot zone (or zone or area of interest alongside the subject or host vehicle). Often, the host shadow may fall on the adjacent lane in the morning or evening time. The host shadow consists of a straight horizontal edge and an edge line with some slope, such as shown in FIG. 14.

The steps involved in processing the image to remove or ignore the host shadow include:
    obtain the target list at the output of processframe( )
    for each target, get the row value (y_Pixel);
    trace for the horizontal edge line around this row value;
    check whether this line is continuous, starting from the subject vehicle body (approximately) and up to and after the lower border of the hot zone;
    check whether this horizontal edge is extended in the hot zone and has a significant pixel count in the hot zone (check against the pixelsomething threshold for that particular line);
    start tracing for the sloped edge line at the end of this horizontal edge;
    if the sloped line is present for some columns it means that there is a host shadow; and
    if there is a host shadow, remove the corresponding target from the target list.

Note that this process may be applied before calculating the target list, so that the host shadow edge pixel count can be subtracted from the line counts. In such an application, all the lines may be scanned until the detection of the host shadow. Vertical edge calculations may not be needed for this process, since, often, if the horizontal edge line of the host shadow is present in the hot zone then the host shadow is getting detected.

Bicycle Detection:

The side object detection system may be operable to detect other objects, such as a bicycle in the zone of interest. For a bicycle, there are small edges compared to a target vehicle, since the bicycle tire is small. In order to detect and track such small edges, we need to tune some of the parameters. For example, some or all of the following listed parameters may be changed to enhance the ability of the system to detect a bicycle:
    SOMETHING_SIZE_CM: some size of the object in cms for reference (Calibration.h);
    gCalibration_SMOOTHING_ALG_THRESHOLD: threshold applied on the peak normal force of the vehicle to see if the detected vehicle was significant (FindEdgePeaks_A( ));

gCalibration.XFILTER_FACTOR: with the pixelsomething threshold of a line, it decides the minimum number of horizontal pixels required for a valid object/target (XFilterNew( ));

gCalibration.HOT_ZONE_COUNT_THRESHOLD_DIVISOR: divisor factor of pixel something threshold of a line at the time of detection of valid objects (ComputeLineCountsR( ));

gCalibration.X_MUST_WARN: the maximum distance for a target to create a warning (when a target is located inside this position (Target X<X Must Warn), a warning for that target may be displayed);

gCalibration.VD_HYSTERESIS_ON: threshold (normal force) at which the algorithm determines a starting point of a target (FindEdgePeaks_A( ));

gCalibration.VD_HYSTERESIS_OFF: threshold at which the algorithm determines the falling off point of a target (FindEdgePeaks_A( ));

gCalibration.LINEERROR: this is the difference between the projected distance and actual distance of a particular target (i.e. line mapping error).

With the parameter tuning, the system may detect many false edges as well. In order to reduce such false edge detections, the vertical edge detection may be used as an additional feature.

Vertical edge detection:
detect the vertical edges for the frame in the area of interest region;
the vertical edge image is scanned for the connected pixels along the columns;
the maximum connected pixels count is compared against the threshold;
based on the comparison result, the decision is made as to whether the target is present or absent.
The vertical edge image may be scanned in the following regions:
Lower limit: the lower limit of the area of interest;
Upper limit: the upper boundary of the nighttime hot zone (FarCenterIndices_N).

This is to reduce or substantially avoid a false vertical edge detection of objects outside the adjacent lane. The vertical edges may correspond to the wheels. When the target vehicle is far away, the vertical edge count will be small, and when the target vehicle is closer, the vertical edge count will be greater. A threshold count may be selected to provide the desired accuracy of the system.

Figure 15:
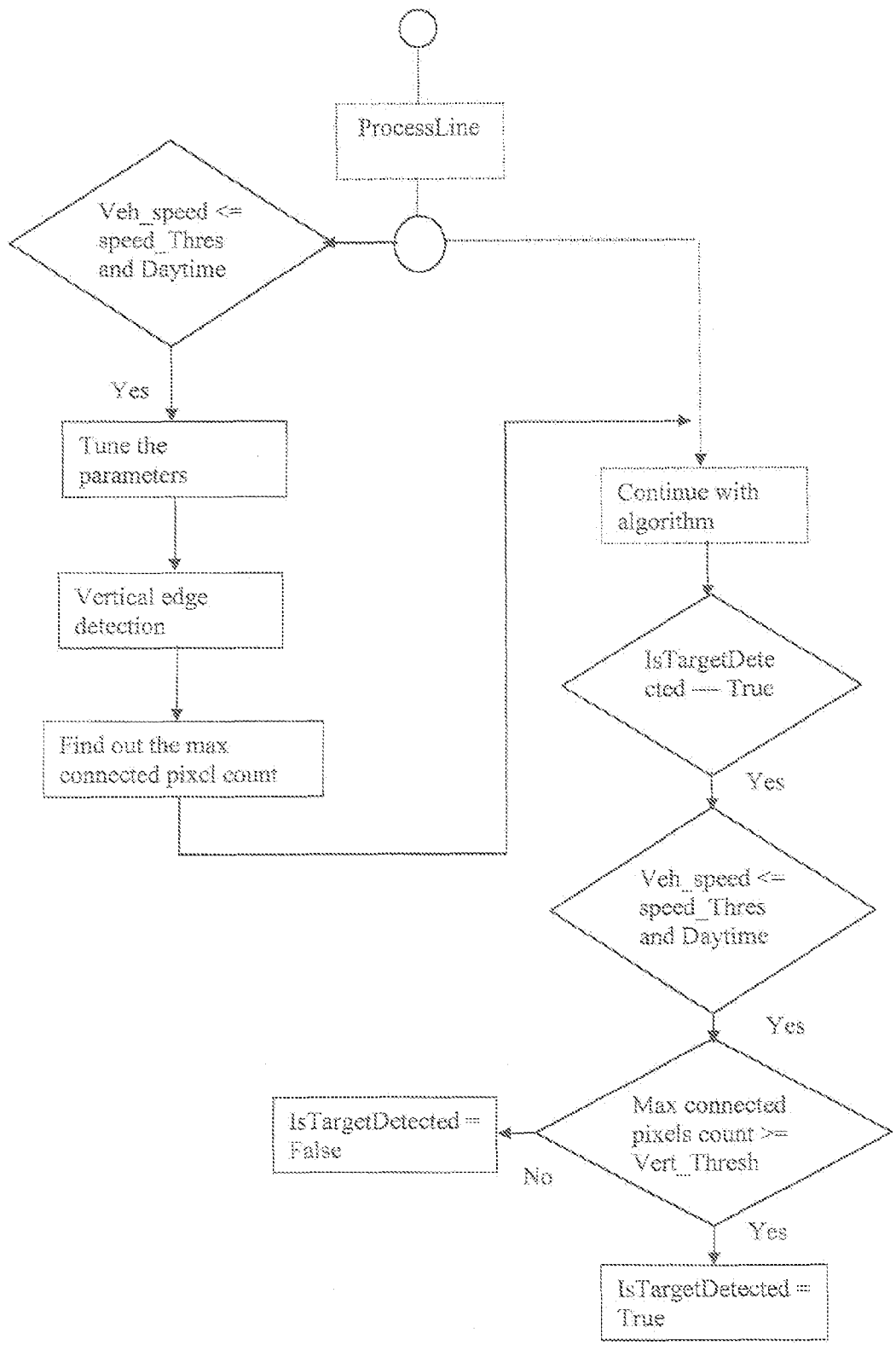
FIG. 15 is a process flow diagram showing the bicycle detection function of the present invention.

The bicycle detection algorithm may be applied during the daytime because the bicycle headlight can be detected with the existing parameters (to be verified), and because little or no vertical edges may be detected during the night time (the detected vertical edges are mainly because of the wheels). Because the bicycle speed is typically low compared to the vehicle speed, the bicycle detection algorithm may be triggered only when the host vehicle speed goes below some threshold speed (such as at or below approximately 20 kph or thereabouts, for example). A flow chart of the bicycle detection process is shown in FIG. 15.

Without the vertical edge detection, some situations may result in false detections. For example, speed breakers beside the road (the system may not consider these as stationary objects because they continuously have edges one after the other which may map with the previous ones, so that some frames in this region are detected as targets), bisectors (the shadow of the bisector may create edges at the upper side of the image, in this region small pixel counts results in edge detection and may result in a detection of a target), roadside dark areas with small white patches. With vertical edge detection as an additional feature, the above false detections may be improved.

Also, it is envisioned that a bicycle rider may not always move straight like a vehicle in the lane. If the front wheel swings, then the projected target may not match with the current detected position. In order to account for this, the line error parameter may be adjusted to some extent. Also, it may be difficult to detect a bicycle if there is a shadow on the road and the bicycle is on the shadowed part of the road.

Target Mapping Tolerance:
Optionally, the object detection system and control may provide a near field detection or target mapping tolerance—line error function. Such a detection may utilize use inputs or calibration parameters. For example, a line error image may provide target-mapping tolerances in the image space due to car vibrations (such as about 3 to 6 pixels), or errors in the image processing (e.g. about 1 pixel for an edge filter), or other inputs. Also, a minimum line error (physical) input may provide target mapping tolerances in the physical space due to small variations in the target vehicle speed (this calibration parameter may be in terms of cms). Likewise, a target speed tolerance factor (such as between 0-100) may provide target mapping tolerances in the physical space, as expected to change with the speed of a target. This factor may determine the size of a tolerance band.

During operation of the object detection system, the control may compute the tolerance (the line error pixels) to be used for the target mapping, which may change with the distance from the camera (i.e., the tolerance may be different for the different lines in the image).

The following provides computations/functions that the control may perform to determine the tolerances and the like.
For example, the computation for the $N^{th}$ line:

---

LineErrorPixels = MAX (LineErrorImage, LineErrorPhysicalInPixels_N).
LineErrorPhysicalInPixels_N = CMtoPIXEL (LineErrorPhysical, N).
CMtoPIXEL (LineErrorPhysical, N) is a function that will convert line error in cm to pixels for a specified line.
LineErrorPhysical = MAX (MinLineErrorPhysical, LineErrorPhysicalWindow).
LineErrorPhysicalWindow =
(TargetSpeedToleranceFactor * ExpectedDistanceCoveredByTarget) / 100.
ExpectedDistanceCoveredByTarget = TargetRelativeSpeed * FrameRate.

---

Day/Night Switch Algorithm:
Optionally, the side object detection system may switch between a daytime sensitivity and a nighttime sensitivity. For example, the algorithm may include the following steps:
1. Compute image histogram (H);
2. compute accumulated image histogram (Ha) using last N (such as, for example, 30) frames;
3. divide Ha into the following four regions:
   (1) dark (0<Gray Level<=Td);
   (2) night (Td<Gray Level<=Tdn);

(3) day (Tdn<Gray Level<Tb); and
(4) bright (Tb<=Gray Level<=255),
using following three thresholds:
(1) Td (0): dark threshold;
(2) Tdn (80): day-night threshold (which may be selected in such a way that it separates day (with/without shadow) from the night (with/without headlights); this may be a fixed threshold computed using arithmetic mean or a geometric mean and auto-threshold); and
(3) Tb (255): bright threshold that is used to separate headlight and overexposed (during day) pixels;
4. count number of pixels into above four regions:
(1) dark region count (Cd);
(2) night region count (Cn);
(3) day region count (Cy); and
(4) bright region count (Cb),
and compute:
(1) difference in Cy and Cn in % of total pixels (Ddn) [where Ddn=(ABS(Cy−Cn)*100)/ImagePixelCount]; and
(2) extreme peak count (Cd+Cb) in % of total pixels (P) [where P=((Cd+Cb)*100)/ImagePixelCount]; and
5. apply the following rules to make a decision:

| Rule No. | Condition(s) | Situation | Decision |
|---|---|---|---|
| 1 | Cn > Cy<br>Ddn >= T1 (sufficient pixels in night region) | Clear Night | Night |
| 2 | Cy > Cn<br>Ddn >= T1 (sufficient pixels in day region) | Clear Day | Day |
| 3 | Cn > Cy<br>Ddn < T1<br>P >= T2 (Extreme peak found) | Night + Headlights | Night |
| 4 | Cn > Cy<br>Ddn < T1<br>P < T2 (No extreme peak found) | Night + Street Light, Day + Clouds, Day + Shadow | No Decision (Previous State) |
| 5 | Cn < Cy<br>Ddn < T1<br>P >= T2 (Extreme peak found) | Day + Overexposure, Day + Snow, Night + Blooming Headlights | No Decision (Previous State) |
| 6 | Cn < Cy<br>Ddn < T1<br>P < T2 (No extreme peak found) | Day + Shadow | Day |

For example, T1=70 percent and T2=2 percent. For rule 4 and 5, additional features may be desired, since the available features may not in all cases be sufficient to differentiate between day and night. If no determination or differentiation is made, the previous state may be retained. The processing time for each frame may be around 1 ms or thereabouts, such as about 0.7 ms.

Headlight Detection:

Optionally, a headlight detection module may be used to improve the nighttime target detection results. Such a module may be integrated with the side object detection algorithm. The headlight detection module or algorithm may use optimized blob analysis code in area of interest, and may identify clusters in an image during nighttime detection mode. The headlight detection module or algorithm may separate out headlights, and saturated and unqualified clusters of lights, and may be able to distinguish between headlights and reflections caused by headlights. The headlight detection module or algorithm may minimize false detections caused because of reflections on the road, or non-headlight light sources. The headlight detection module may detect the position of the headlight, and thus may provide enhanced positional accuracy while target detection. The headlight detection module may also be useful in dusk and dawn condition.

It is envisioned that, by analysis of the saturated clusters, the camera gain and exposure can be controlled in close loop, and thus the day/night switch detection can be improved. It is further envisioned that, for more accuracy, the system may detect both headlights to assist in making the decision of target detection (such as for detecting cars and/or trucks). Also, most or substantially all of the saturated and not qualified clusters may be examined for possible merging of two headlights, such as when the vehicle is far away from the camera on the subject or host vehicle.

Figure 16:
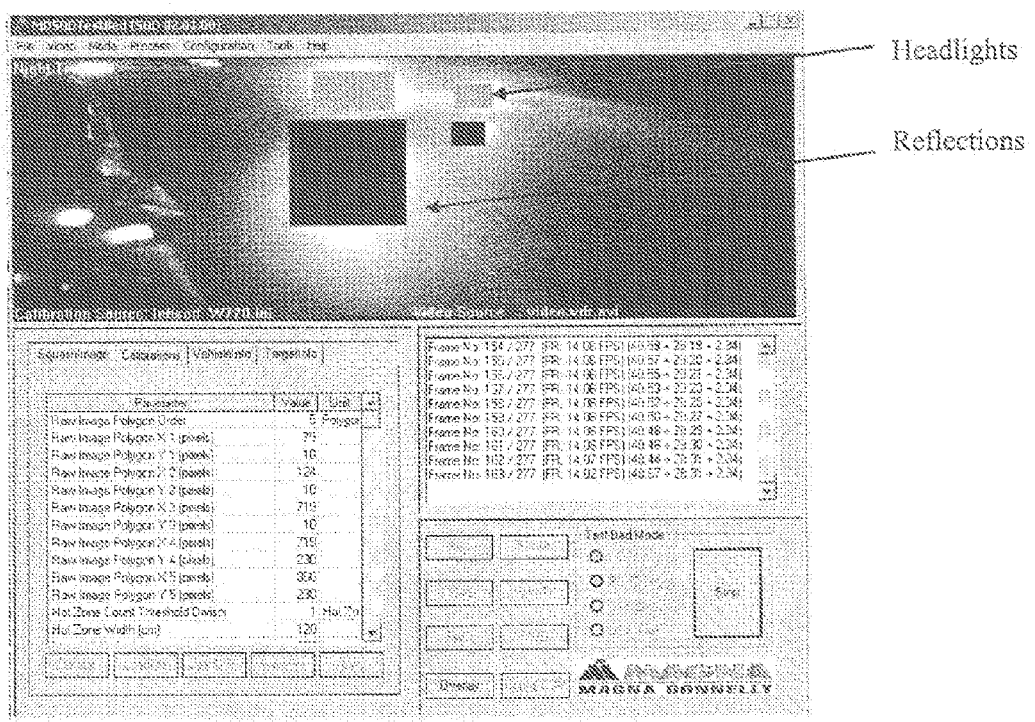
FIGS. 16-20 are representations of captured images of the side area of the subject vehicle, showing the headlight detection function of the present invention.
Figure 17:
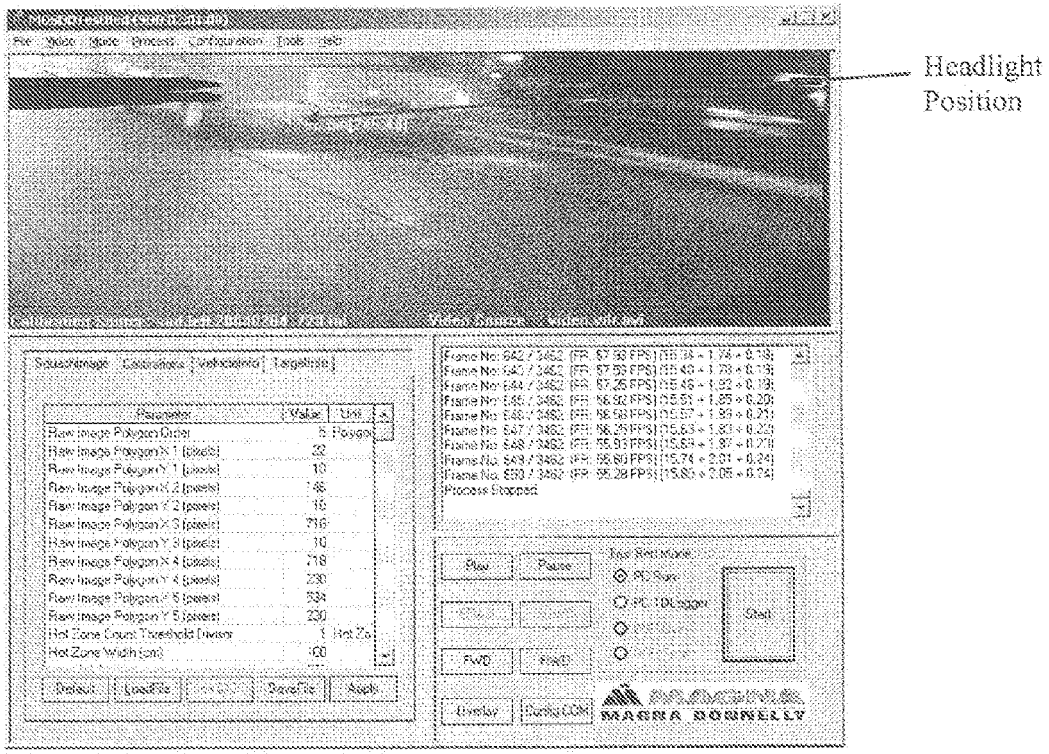
Figure 18:
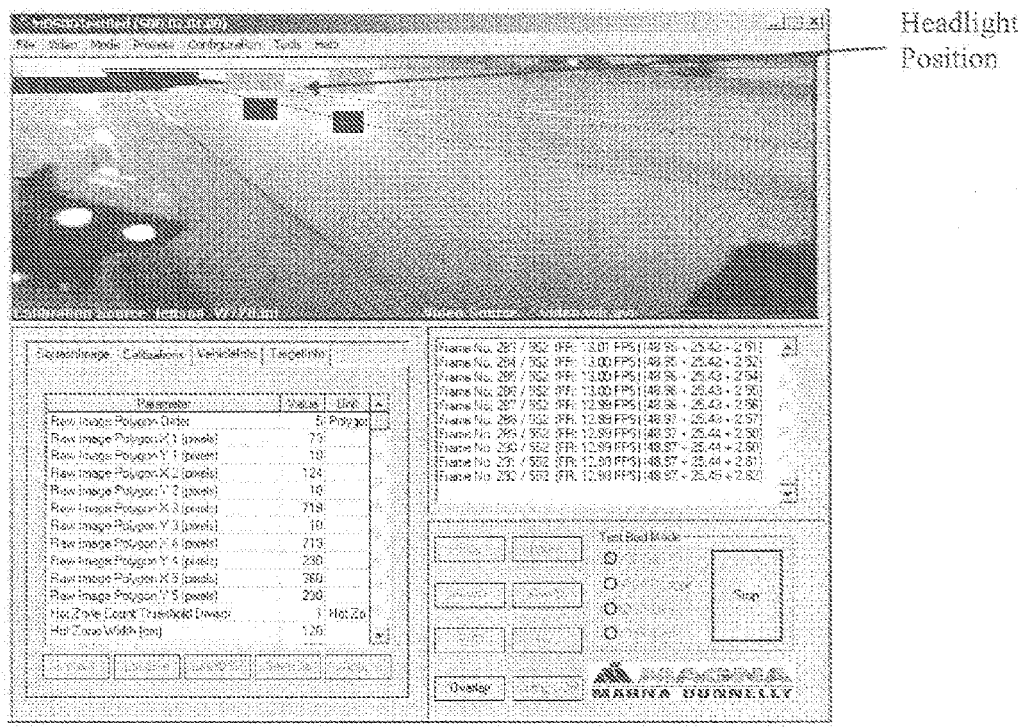
Figure 19:
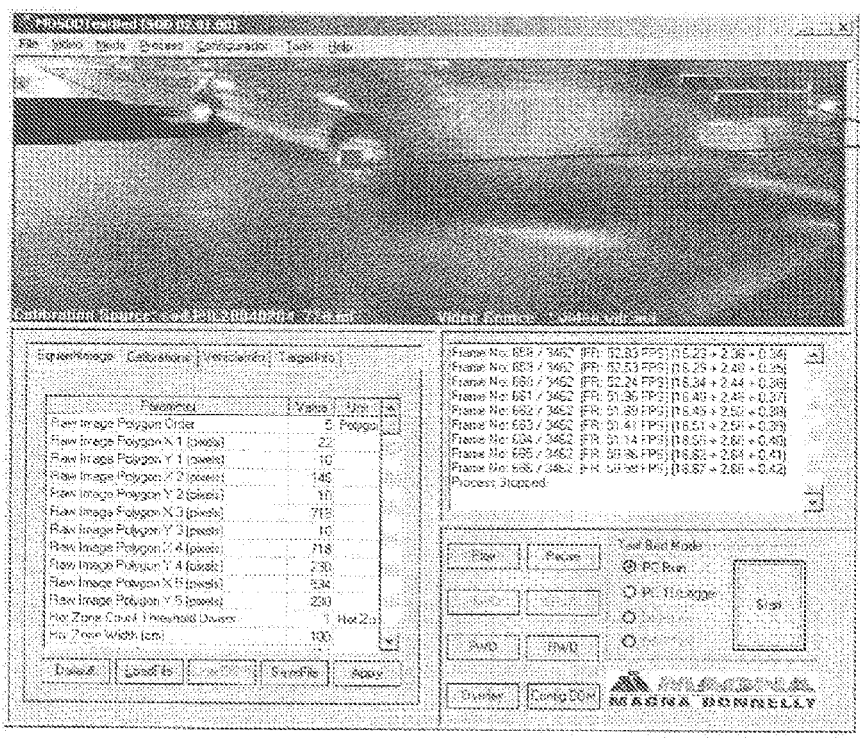
Figure 20:
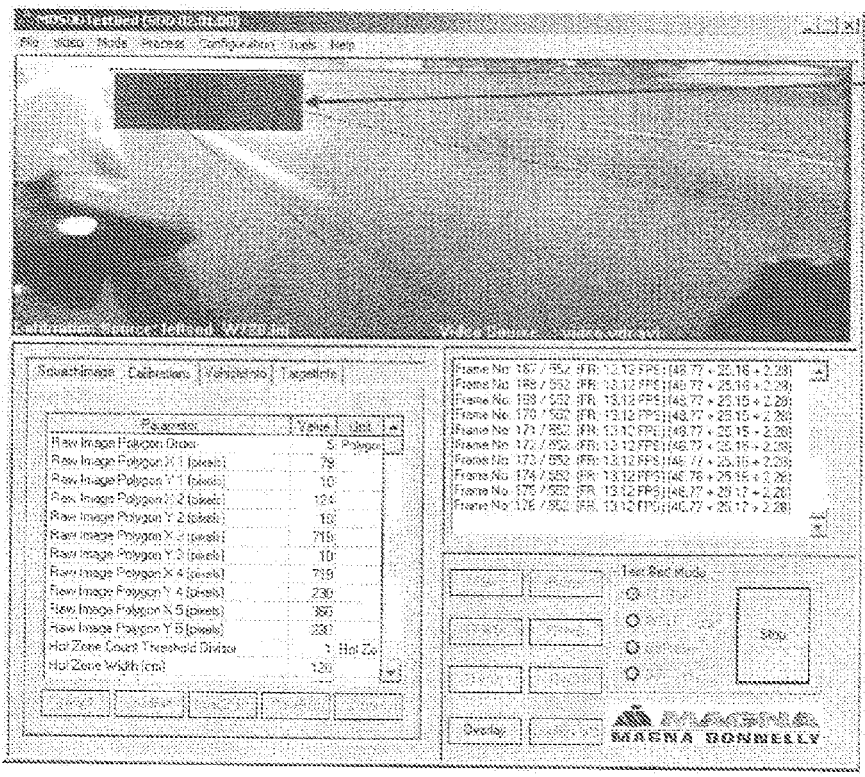

Referring now to FIGS. 16-20, the process of identifying the headlights of a target vehicle is shown. As shown in FIG. 16, the headlights and their reflections are identified, and, as shown in FIGS. 17 and 18, the particular location or position of the headlight/headlights is identified as a target position. The non-headlight sources are identified separately (FIG. 19), and the saturated clusters are identified (FIG. 20), such as may be useful in close loop control of the side object detection system.

The table below indicates the effect on the timing of the detection/identification of side objects, as shown with and without the headlight detection function:

| Modules | With Headlight Detection (mili-second) | Without Headlight Detection (mili-second) |
|---|---|---|
| Process Line | 17.5 | 17.5 |
| Generate Edge image | 3.4 | 3.4 |
| Process Frame | 17.5 | 17.45 |
| Map Targets | 1 | 1 |
| Headlight Detection | 12.9 | — |
| Total | 52.3 | 39.35 |
| Frame Rate | 15 FPS | 15 FPS |

Optionally, the side object detection system and/or the imaging sensor or camera may be associated with other imaging systems or controls, such as imaging systems having an image sensor (such as a video camera, such as a CMOS imaging array sensor, a CCD sensor or the like, such as the types of imaging sensors or cameras disclosed in commonly assigned, U.S. Pat. Nos. 5,550,677; 6,097,023 and 5,796,094, and/or PCT Application No. PCT/US2003/036177, filed Nov. 14, 2003 and published Jun. 3, 2004 as International Publication No. WO 2004/047421, which are hereby incorporated herein by reference), such as a forward facing video image sensor or system, which may include or may be associated with an intelligent rain sensor (such as the types disclosed in commonly assigned U.S. Pat. Nos. 6,320,176; 6,353,392 and 6,313,454, which are hereby incorporated herein by reference), an image or vision system (including an imaging sensor, such as a video camera, such as a CMOS imaging array sensor, a CCD sensor or the like, such as the types disclosed in commonly assigned, U.S. Pat. Nos. 5,550,677; 6,097,023 and 5,796,094, and U.S. patent application Ser. No. 10/422,378, filed Apr. 24, 2003, now U.S. Pat. No. 6,946,978, which are hereby incorporated herein by reference), such as an imaging or object detection system or back up aid of the types described in U.S. Pat. Nos. 6,757,109; 6,717,610; 6,590,719; 6,201,642; 5,929,786; and/or 5,786, 772, and/or U.S. patent application Ser. No. 10/427,051, filed Apr. 30, 2003, now U.S. Pat. No. 7,038,577; and/or Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; and/or Ser. No. 60/618,686, filed Oct. 14, 2004, which are hereby incorporated herein by reference, or an intelligent headlamp controller (such as the types described in U.S. Pat. Nos. 5,796,094; 5,715,093; and/or 6,824,281, and/or in U.S. patent application Ser. No. 10/958,087, filed Oct. 4, 2004, now U.S. Pat. No. 7,188,963; and/or Ser. No. 11/105,757, filed Apr. 14, 2005, now U.S. Pat. No. 7,526,103, and/or U.S. provisional applications, Ser. No. 60/607,963, filed Sep. 8, 2004; and Ser. No. 60/562,480, filed Apr. 15, 2004, which are hereby incorporated herein by reference), or an intelligent lane departure warning system (such as the types described in U.S. patent application Ser. No. 10/209,173, filed Jul. 31, 2001, now U.S. Pat. No. 6,882,287; and/or Ser. No. 10/427, 051, filed Apr. 30, 2003, now U.S. Pat. No. 7,038,577, which are hereby incorporated herein by reference), and/or the like.

Optionally, the side object detection system of the present invention may include one or more displays, such as a text display, an icon display, a display on demand (DOD) type display (such as may be implemented with a transflective reflective element, such as described in U.S. Pat. Nos. 5,668, 663; 5,724,187; and 6,690,268, the entire disclosures of which are hereby incorporated by reference herein), such as a video or touch screen interface display, or a video display screen, such as the types described in PCT Application No. PCT/US03/40611, filed Dec. 19, 2003 and published on Jul. 15, 2004 as International Publication No. WO 2004/058540, and/or U.S. patent application Ser. No. 10/538,724, filed Jun. 13, 2005 and published Mar. 9, 2006 as U.S. Publication No. US-2006-0050018; and Ser. No. Ser. No. 11/284,543, filed Nov. 22, 2005, now U.S. Pat. No. 7,370,983; and/or U.S. provisional applications, Ser. No. 60/630,061, filed Nov. 22, 2004; and Ser. No. 60/667,048, filed Mar. 31, 2005, which are hereby incorporated herein by reference, or the like.

Therefore, the present invention provides a side object detection system that is operable to process captured image data of a scene occurring exteriorly and along one or both sides of the vehicle to determine if a target vehicle or object of interest is located at or in the lane adjacent to the subject or host vehicle. The side object detection system of the present invention may process zones or areas of interest in the captured images and may adjust processing to accommodate any misalignment of the camera that may occur during installation of the camera at the side of the vehicle. The side object detection system may also adjust the processing to adjust the areas of interest, such as in response to a turning of the wheels of the vehicle so that the zone or area is adapted for the turning of the subject vehicle. The side object detection system may detect horizontal edges and vertical edges of objects in the exterior scene and may identify shadows and discern the shadows in the adjacent lane (which may be shadows cast by objects outside of the adjacent lane) from objects or target vehicles that may be present in the adjacent lane. The side object detection system of the present invention may also discern or distinguish between daytime and nighttime conditions and may adjust the image processing accordingly. The side object detection system may also function to detect headlights of a target vehicle in the adjacent lane and to discern or distinguish the headlights of the target vehicle from other light sources, such as reflections or other non-qualified light sources. The side object detection system of the present invention thus provides enhanced image processing and may utilize aspects of the side object detection system described in U.S. patent application Ser. No. 10/209,173, filed Jul. 31, 2001, now U.S. Pat. No. 6,882,287; and/or Ser. No. 10/427, 051, filed Apr. 30, 2003, now U.S. Pat. No. 7,038,577, which are hereby incorporated herein by reference.

Changes and modifications in the specifically described embodiments can be carried out without departing from the principles of the present invention, which is intended to be limited only by the scope of the appended claims as interpreted according to the principles of patent law.

What is claimed is:

1. An imaging system for detecting objects exterior of a vehicle, said imaging system comprising:

an imaging device comprising an array of photo-sensing elements, wherein said imaging device is disposed at a vehicle equipped with said imaging system, and wherein said imaging device captures image data;

wherein, with said imaging device disposed at the equipped vehicle, said imaging device has a field of view exterior of the equipped vehicle;

a control for processing image data captured by said imaging device;

wherein said control utilizes edge detection in processing captured image data;

wherein, responsive at least in part to processing of captured image data by said control, said control determines objects of interest present in the field of view of said imaging device;

wherein objects of interest determined to be present in the field of view of said imaging device comprise at least one of (i) vehicles present exterior of the equipped vehicle and (ii) headlights of vehicles present exterior of the equipped vehicle;

wherein said control is operable to determine at least one of (i) a bicycle that is present exterior of the equipped vehicle and (ii) a bicycle rider that is present exterior of the equipped vehicle;

wherein, responsive at least in part to processing of captured image data by said control, a driver of the equipped vehicle is alerted to a hazardous condition; and wherein said control processes a reduced data set of said captured image data to determine objects of interest present exterior of the equipped vehicle.

2. The imaging system of claim 1, wherein said control is operable to adjust processing of captured image data to accommodate misalignment of said imaging device when said imaging device is disposed at the equipped vehicle.

3. The imaging system of claim 1, wherein said control is operable to distinguish between objects present in the field of view of said imaging device and shadows of objects.

4. The imaging system of claim 1, wherein said control is operable to at least one of (a) determine that an object present in the field of view is a headlight of a vehicle forward of the equipped vehicle, (b) determine that an object present in the field of view is a headlight of a vehicle rearward of the equipped vehicle and (b) determine that an object present in the field of view is a headlight of a vehicle that is sideward of the equipped vehicle.

5. The imaging system of claim 1, wherein said imaging device captures image data for at least one of (a) a headlamp control system for detecting a headlamp of a vehicle present in the field of view of said imaging device and (b) a lane departure warning system.

6. The imaging system of claim 1, wherein said control distinguishes a headlight of a vehicle that is present exterior of the equipped vehicle in the field of view of said imaging device from other light sources present in the field of view of said imaging device.

7. The imaging system of claim 1, wherein said control is operable to switch between daytime and nighttime algorithms in response to an ambient light level at the equipped vehicle.

8. The imaging system of claim 1, wherein said control determines that a bicycle is present exterior of the equipped vehicle at least in part responsive to a determined speed of the bicycle.

9. The imaging system of claim 1, wherein said use of said edge detection by said control comprises determination of generally vertical edges of objects present in the field of view of said imaging device.

10. The imaging system of claim 9, wherein said determined generally vertical edges are used at least in part in identification of objects of interest by said control.

11. The imaging system of claim 1, wherein, in determining objects of interest present in the field of view of said imaging device, edges that are not indicative of objects of interest are substantially ignored in order to at least one of (a) reduce processing requirements and (b) reduce false signals.

12. The imaging system of claim 1, wherein said control determines that an object of interest determined to be present in the field of view of said imaging device is a wheel.

13. The imaging system of claim 1, wherein said imaging device is disposed behind the windshield of the equipped vehicle and wherein said imaging device views through the windshield and forward of the equipped vehicle, and wherein said array of photo-sensing elements comprises a CMOS array of photo-sensing elements.

14. The imaging system of claim 1, wherein said field of view of said imaging device encompasses a portion of the equipped vehicle.

15. The imaging system of claim 14, wherein said control is operable to determine that the portion of the equipped vehicle is not an object of interest.

16. The imaging system of claim 1, wherein the field of view of said imaging device encompasses (a) a rearward field of view at least partially rearward of the equipped vehicle, (b) a sideward field of view at least partially sideward of the equipped vehicle and (c) a forward field of view at least partially forward of the equipped vehicle.

17. The imaging system of claim 1, wherein said imaging device is disposed at a side of the equipped vehicle and has a field of view at least one of rearward of the equipped vehicle and sideward of the equipped vehicle.

18. The imaging system of claim 17, wherein a portion of the side of the equipped vehicle is present in the field of view of said imaging device and wherein said control determines that the portion of the equipped vehicle is not an object of interest.

19. The imaging system of claim 1, wherein said reduced data set is representative of a target zone that is encompassed by the field of view of said imaging device.

20. The imaging system of claim 19, wherein the target zone is not inclusive of a portion of the equipped vehicle.

21. The imaging system of claim 20, wherein said control adjusts the target zone responsive to a steering angle of the wheels of the equipped vehicle.

22. The imaging system of claim 1, wherein said control is operable to select said reduced image data set in response to a change in the travel speed of the equipped vehicle.

23. The imaging system of claim 1, wherein said control is operable to select said reduced image data set based at least in part on a steering angle of the equipped vehicle.

24. The imaging system of claim 1, wherein the driver of the equipped vehicle is alerted that an object of interest is determined to be present in the field of view of said imaging device.

25. The imaging system of claim 1, wherein a video display screen is located in an interior cabin of the equipped vehicle and is viewable by the driver of the equipped vehicle, and wherein images are displayed by said video display screen that are derived, at least in part, from image data captured by said imaging device.

26. An imaging system for detecting objects exterior of a vehicle, said imaging system comprising:

an imaging device comprising a CMOS array of photo-sensing elements, wherein said imaging device is disposed at a vehicle equipped with said imaging system, and wherein said imaging device captures image data;

wherein, with said imaging device disposed at the equipped vehicle, said imaging device has a field of view exterior of the equipped vehicle;

a control for processing image data captured by said imaging device;

wherein said control utilizes edge detection in processing captured image data;

wherein, responsive at least in part to processing of captured image data by said control, said control determines objects of interest present in the field of view of said imaging device;

wherein objects of interest determined to be present in the field of view of said imaging device comprise at least one of (i) vehicles present exterior of the equipped vehicle and (ii) headlights of vehicles present exterior of the equipped vehicle;

wherein said control is operable to determine at least one of (i) a bicycle that is present exterior of the equipped vehicle and (ii) a bicycle rider that is present exterior of the equipped vehicle;

wherein, responsive at least in part to processing of captured image data by said control, a driver of the equipped vehicle is alerted to a hazardous condition; and wherein said imaging device captures image data for at least one of (a) a headlamp control system for detecting a headlamp of a vehicle present in the field of view of said imaging device and (b) a lane departure warning system.

27. The imaging system of claim 26, wherein said control is operable to distinguish between objects present in the field of view of said imaging device and shadows of objects.

28. The imaging system of claim 26, wherein said control is operable to switch between daytime and nighttime algorithms in response to an ambient light level at the equipped vehicle.

29. The imaging system of claim 26, wherein said imaging device is disposed behind the windshield of the equipped vehicle and wherein said imaging devices views through the windshield and forward of the equipped vehicle.

30. The imaging system of claim 26, wherein said field of view of said imaging device encompasses a portion of the equipped vehicle, and wherein said control is operable to determine that the portion of the equipped vehicle is not an object of interest.

31. The imaging system of claim 26, wherein said control processes a reduced data set of said captured image data to determine objects of interest, and wherein said reduced data set is representative of a target zone that is encompassed by the field of view of said imaging device.

32. The imaging system of claim 31, wherein at least one of (i) the target zone is not inclusive of a portion of the equipped vehicle, (ii) said control is operable to select said reduced image data set in response to a function of the equipped vehicle, (iii) said control is operable to select said reduced image data set in response to a change in the travel speed of the equipped vehicle and (iv) said control is operable to select said reduced image data set in response to a steering angle of the equipped vehicle.

33. An imaging system for detecting objects exterior of a vehicle, said imaging system comprising:
   an imaging device comprising an array of photo-sensing elements, wherein said imaging device is disposed at a vehicle equipped with said imaging system, and wherein said imaging device captures image data;
   wherein, with said imaging device disposed at the equipped vehicle, said imaging device has a field of view exterior of the equipped vehicle;
   wherein said imaging device is disposed behind the windshield of the equipped vehicle and wherein said imaging devices views through the windshield and forward of the equipped vehicle;
   a control for processing image data captured by said imaging device;
   wherein, responsive at least in part to processing of captured image data by said control, said control determines objects of interest present in the field of view of said imaging device;
   wherein said control is operable to determine at least one of (i) a bicycle that is present exterior of the equipped vehicle and (ii) a bicycle rider that is present exterior of the equipped vehicle;
   wherein, responsive at least in part to processing of captured image data by said control, a driver of the equipped vehicle is alerted to a hazardous condition;
   wherein said imaging device captures image data for at least one of (a) a headlamp control system for detecting a headlamp of a vehicle present in the field of view of said imaging device and (b) a lane departure warning system;
   wherein said control processes a reduced data set of said captured image data to determine objects of interest; and
   wherein at least one of (i) said reduced data set is representative of a target zone that is encompassed by the field of view of said imaging device and (ii) said control is operable to select said reduced image data set in response to a function of the equipped vehicle.

34. The imaging system of claim 33, wherein said control is operable to select said reduced image data set in response to a function of the equipped vehicle and wherein said function comprises at least one of (i) a change in the travel speed of the equipped vehicle and (ii) a steering angle of the equipped vehicle.

35. The imaging system of claim 33, wherein said reduced data set is representative of a target zone that is encompassed by the field of view of said imaging device and that is not inclusive of a portion of the equipped vehicle.

36. The imaging system of claim 33, wherein said control is operable to distinguish between objects present in the field of view of said imaging device and shadows of objects.

37. The imaging system of claim 33, wherein said control is operable to switch between daytime and nighttime algorithms in response to an ambient light level at the equipped vehicle.

38. The imaging system of claim 33, wherein said control utilizes edge detection in processing captured image data.

39. The imaging system of claim 33, wherein said field of view of said imaging device encompasses a portion of the equipped vehicle, and wherein said control is operable to determine that the portion of the equipped vehicle is not an object of interest.

40. The imaging system of claim 33, wherein objects of interest determined to be present in the field of view of said imaging device comprise at least one of (i) vehicles present exterior of the equipped vehicle and (ii) headlights of vehicles present exterior of the equipped vehicle.

41. An imaging system for detecting objects exterior of a vehicle, said imaging system comprising:
   an imaging device comprising an array of photo-sensing elements, wherein said imaging device is disposed at a vehicle equipped with said imaging system, and wherein said imaging device captures image data;
   wherein, with said imaging device disposed at the equipped vehicle, said imaging device has a field of view exterior of the equipped vehicle;
   wherein said imaging device is disposed behind the windshield of the equipped vehicle and wherein said imaging devices views through the windshield and forward of the equipped vehicle;
   a control for processing image data captured by said imaging device;
   wherein said control utilizes edge detection in processing captured image data;
   wherein, responsive at least in part to processing of captured image data by said control, said control determines objects of interest present in the field of view of said imaging device;
   wherein said control is operable to determine at least one of (i) a bicycle that is present exterior of the equipped vehicle and (ii) a bicycle rider that is present exterior of the equipped vehicle;
   wherein, responsive at least in part to processing of captured image data by said control, a driver of the equipped vehicle is alerted to a hazardous condition; and
   wherein said imaging device captures image data for at least one of (a) a headlamp control system for detecting a headlamp of a vehicle present in the field of view of said imaging device and (b) a lane departure warning system.

42. The imaging system of claim 41, wherein said control processes a reduced data set of said captured image data to determine objects of interest, and wherein said reduced data set is representative of a target zone that is encompassed by the field of view of said imaging device.

43. The imaging system of claim 42, wherein at least one of (i) the target zone is not inclusive of a portion of the equipped vehicle, (ii) said control is operable to select said reduced image data set in response to a function of the equipped vehicle, (iii) said control is operable to select said reduced image data set in response to a change in the travel speed of the equipped vehicle and (iv) said control is operable to select said reduced image data set in response to a steering angle of the equipped vehicle.

44. The imaging system of claim 41, wherein at least one of (a) said control is operable to adjust processing of captured image data to accommodate misalignment of said imaging device when said imaging device is disposed at the equipped vehicle, (b) said control is operable to distinguish between objects present in the field of view of said imaging device and shadows of objects and (c) in determining objects of interest present in the field of view of said imaging device, edges that are not indicative of objects of interest are substantially ignored.

45. An imaging system for detecting objects exterior of a vehicle, said imaging system comprising:
   an imaging device comprising an array of photo-sensing elements, wherein said imaging device is disposed at a vehicle equipped with said imaging system, and wherein said imaging device captures image data;

wherein, with said imaging device disposed at the equipped vehicle, said imaging device has a field of view exterior of the equipped vehicle;

wherein said imaging device is disposed behind the windshield of the equipped vehicle and wherein said imaging devices views through the windshield and forward of the equipped vehicle;

a control for processing image data captured by said imaging device;

wherein, responsive at least in part to processing of captured image data by said control, said control determines objects of interest present in the field of view of said imaging device;

wherein said control is operable to determine at least one of (i) a bicycle that is present exterior of the equipped vehicle and (ii) a bicycle rider that is present exterior of the equipped vehicle;

wherein, responsive at least in part to processing of captured image data by said control, a driver of the equipped vehicle is alerted to a hazardous condition;

wherein said imaging device captures image data for at least one of (a) a headlamp control system for detecting a headlamp of a vehicle present in the field of view of said imaging device and (b) a lane departure warning system; and wherein at least one of (a) said control is operable to adjust processing of captured image data to accommodate misalignment of said imaging device when said imaging device is disposed at the equipped vehicle, (b) said control is operable to distinguish between objects present in the field of view of said imaging device and shadows of objects and (c) said control processes a reduced data set of said captured image data to determine objects of interest.

46. The imaging system of claim 45, wherein said control processes a reduced data set of said captured image data to determine objects of interest and wherein said reduced data set is representative of a target zone that is encompassed by the field of view of said imaging device.

47. The imaging system of claim 46, wherein at least one of (i) the target zone is not inclusive of a portion of the equipped vehicle, (ii) said control is operable to select said reduced image data set in response to a function of the equipped vehicle, (iii) said control is operable to select said reduced image data set in response to a change in the travel speed of the equipped vehicle and (iv) said control is operable to select said reduced image data set in response to a steering angle of the equipped vehicle.

* * * * *

UNITED STATES PATENT AND TRADEMARK OFFICE
CERTIFICATE OF CORRECTION

| | | |
|---|---|---|
| PATENT NO. | : 8,543,277 B2 | Page 1 of 1 |
| APPLICATION NO. | : 13/776100 | |
| DATED | : September 24, 2013 | |
| INVENTOR(S) | : Michael J. Higgins-Luthman | |

It is certified that error appears in the above-identified patent and that said Letters Patent is hereby corrected as shown below:

In the Specification

Column 8
Line 14, "(XPn) YPn)" should be --(XPn, YPn)--

Column 10
Line 64, "gCalibration_SMOOTHING_ALG_THRESHOLD:" should be
--gCalibration.SMOOTHING_ALG_THRESHOLD:--

Signed and Sealed this
Twenty-fifth Day of November, 2014

Michelle K. Lee
*Deputy Director of the United States Patent and Trademark Office*